United States Patent
Ko et al.

(10) Patent No.: US 11,243,634 B2
(45) Date of Patent: Feb. 8, 2022

(54) FLEXIBLE DISPLAY AND ELECTRONIC DEVICE EQUIPPED WITH SAME

(71) Applicant: Samsung Electronics Co., Ltd., Gyeonggi-do (KR)

(72) Inventors: Seunghoon Ko, Gyeonggi-do (KR); Gidae Kim, Gyeonggi-do (KR); Jungchul An, Gyeonggi-do (KR); Joungmin Cho, Gyeonggi-do (KR); Kwangtai Kim, Gyeonggi-do (KR); Hyungsup Byeon, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/050,545

(22) PCT Filed: Apr. 25, 2019

(86) PCT No.: PCT/KR2019/005002
§ 371 (c)(1),
(2) Date: Oct. 26, 2020

(87) PCT Pub. No.: WO2019/209041
PCT Pub. Date: Oct. 31, 2019

(65) Prior Publication Data
US 2021/0240294 A1    Aug. 5, 2021

(30) Foreign Application Priority Data
Apr. 25, 2018  (KR) .......................... 10-2018-0048031

(51) Int. Cl.
*G06F 3/041*    (2006.01)
*G06F 3/044*    (2006.01)

(52) U.S. Cl.
CPC .......... *G06F 3/0416* (2013.01); *G06F 3/0446* (2019.05); *G06F 2203/04102* (2013.01)

(58) Field of Classification Search
CPC ................. G06F 3/0416; G06F 3/0446; G06F 2203/04102
See application file for complete search history.

(56) References Cited

U.S. PATENT DOCUMENTS 7,283,847 B2 * 10/2007 Kim ........................ H04M 1/23
                                                    455/566
7,859,521 B2    12/2010 Hotelling et al.
(Continued)

FOREIGN PATENT DOCUMENTS

KR    10-2017-0043121 A    4/2017
KR    10-2017-0047057 A    5/2017
(Continued)

OTHER PUBLICATIONS

Korean Search Report dated Jan. 18, 2021.

*Primary Examiner* — Amy Onyekaba
(74) *Attorney, Agent, or Firm* — Cha & Reiter, LLC

(57) ABSTRACT

Provided is a flexible display. A flexible display, having a first region and a second region extending therefrom in a first direction, may comprise: a display panel comprising a pixel array; and a touch sensor layer comprising first electrodes arranged on the first region and second electrodes arranged on the second region; and switches, each electrically connecting a first and second electrodes.

14 Claims, 19 Drawing Sheets

(56) References Cited

U.S. PATENT DOCUMENTS

| | | | |
|---|---|---|---|
| 7,995,041 B2* | 8/2011 | Chang | G06F 3/0445 |
| | | | 345/173 |
| 8,217,913 B2 | 7/2012 | Hotelling et al. | |
| 9,134,560 B2 | 9/2015 | Hotelling et al. | |
| 9,477,269 B2* | 10/2016 | Morrison | G06F 1/1616 |
| 9,619,083 B1* | 4/2017 | Kang | G09G 5/006 |
| 9,946,399 B2 | 4/2018 | Kang et al. | |
| 10,146,259 B1* | 12/2018 | Wu | G06F 1/1681 |
| 10,944,281 B2* | 3/2021 | Momo | H01M 10/0585 |
| 10,985,332 B2* | 4/2021 | Shin | H01L 27/3237 |
| 2007/0157487 A1* | 7/2007 | Hyun | G02F 1/133608 |
| | | | 36/118.9 |
| 2008/0297676 A1* | 12/2008 | Kimura | H01L 27/124 |
| | | | 349/39 |
| 2010/0110041 A1* | 5/2010 | Jang | G06F 3/0412 |
| | | | 345/174 |
| 2010/0194707 A1* | 8/2010 | Hotelling | G02F 1/13338 |
| | | | 345/173 |
| 2010/0298032 A1* | 11/2010 | Lee | G06F 1/1677 |
| | | | 455/566 |
| 2011/0012858 A1* | 1/2011 | Brookes | G06F 1/1647 |
| | | | 345/173 |
| 2011/0210937 A1* | 9/2011 | Kee | G06F 3/04164 |
| | | | 345/174 |
| 2012/0086658 A1* | 4/2012 | Moradian | G06F 1/1647 |
| | | | 345/173 |
| 2012/0120006 A1* | 5/2012 | Liu | G06F 3/0446 |
| | | | 345/173 |
| 2012/0162099 A1* | 6/2012 | Yoo | G06F 3/0443 |
| | | | 345/173 |
| 2013/0058063 A1* | 3/2013 | O'Brien | G06F 1/1652 |
| | | | 361/807 |
| 2014/0139447 A1* | 5/2014 | Kang | G06F 3/04164 |
| | | | 345/173 |
| 2014/0204037 A1* | 7/2014 | Kim | G06F 3/03 |
| | | | 345/173 |
| 2014/0380186 A1* | 12/2014 | Kim | G06F 1/1624 |
| | | | 715/746 |
| 2015/0207102 A1* | 7/2015 | Jeong | G06F 3/044 |
| | | | 257/40 |
| 2015/0362960 A1* | 12/2015 | Chang | G06F 1/1692 |
| | | | 345/173 |
| 2016/0018855 A1* | 1/2016 | Liao | G06F 1/1652 |
| | | | 361/679.56 |
| 2016/0143131 A1* | 5/2016 | Ahn | H04M 1/0237 |
| | | | 361/749 |
| 2016/0202781 A1* | 7/2016 | Kim | G06F 3/041 |
| | | | 345/173 |
| 2016/0209877 A1* | 7/2016 | Chong | H01L 27/1255 |
| 2016/0246432 A1* | 8/2016 | Hong | G06F 1/1652 |
| 2016/0259514 A1* | 9/2016 | Sang | G06F 1/1694 |
| 2016/0293634 A1* | 10/2016 | Kim | H01L 27/1218 |
| 2016/0299387 A1* | 10/2016 | Yamazaki | G06F 3/04164 |
| 2016/0370924 A1* | 12/2016 | Hou | G06F 3/04164 |
| 2017/0023979 A1* | 1/2017 | Yamazaki | G06F 1/181 |
| 2017/0038641 A1* | 2/2017 | Yamazaki | G02F 1/133308 |
| 2017/0052698 A1* | 2/2017 | Seo | H04M 1/0214 |
| 2017/0064847 A1* | 3/2017 | Lim | G09F 9/00 |
| 2017/0068275 A1* | 3/2017 | Lee | G06F 1/1616 |
| 2017/0090637 A1* | 3/2017 | Yoon | H04M 1/0266 |
| 2017/0102813 A1* | 4/2017 | Kuo | G06F 3/0443 |
| 2017/0102824 A1 | 4/2017 | Kang et al. | |
| 2017/0115801 A1* | 4/2017 | Shih | G06F 3/04164 |
| 2017/0123455 A1* | 5/2017 | Park | G06F 1/1681 |
| 2017/0154609 A1* | 6/2017 | Yoon | G09G 5/38 |
| 2017/0168644 A1 | 6/2017 | Kang et al. | |
| 2017/0169741 A1* | 6/2017 | Lim | G06F 1/1624 |
| 2017/0212607 A1* | 7/2017 | Yoon | G06F 1/1652 |
| 2017/0212613 A1* | 7/2017 | Hwang | G06F 1/1686 |
| 2017/0228084 A1* | 8/2017 | Kim | G06F 3/0412 |
| 2017/0270405 A1* | 9/2017 | Kurokawa | G11C 7/1006 |
| 2017/0286042 A1* | 10/2017 | Lee | G06F 3/0482 |
| 2017/0287992 A1* | 10/2017 | Kwak | G06F 1/1686 |
| 2017/0308126 A1* | 10/2017 | Yang | G06F 1/1652 |
| 2017/0364119 A1* | 12/2017 | Lee | G06F 1/1624 |
| 2018/0011576 A1* | 1/2018 | Ryu | H01L 51/5253 |
| 2018/0031943 A1* | 2/2018 | Yamazaki | G02B 26/04 |
| 2018/0033980 A1* | 2/2018 | Park | H01L 51/0533 |
| 2018/0039352 A1* | 2/2018 | Wu | G06F 3/044 |
| 2018/0059721 A1* | 3/2018 | Akimoto | G06F 1/1618 |
| 2018/0062090 A1* | 3/2018 | Kim | H01L 51/5259 |
| 2018/0089485 A1* | 3/2018 | Bok | G06K 9/0002 |
| 2018/0097199 A1* | 4/2018 | Jo | H01L 27/3276 |
| 2018/0113547 A1* | 4/2018 | Miyake | G02F 1/1368 |
| 2018/0113564 A1* | 4/2018 | Takahashi | G06F 3/04166 |
| 2018/0114506 A1* | 4/2018 | Takahashi | G09G 3/3233 |
| 2018/0151539 A1* | 5/2018 | Nakamura | H01L 27/3267 |
| 2018/0182838 A1* | 6/2018 | Yeo | H01L 27/3288 |
| 2018/0196573 A1* | 7/2018 | Kang | G06F 3/04184 |
| 2018/0335679 A1* | 11/2018 | Hashimoto | G06F 1/1641 |
| 2018/0343330 A1* | 11/2018 | Lin | H04M 1/0268 |
| 2019/0212841 A1* | 7/2019 | Chang | G06F 3/047 |
| 2020/0033992 A1* | 1/2020 | Kitada | G06F 3/0414 |
| 2020/0387251 A1* | 12/2020 | Nakanishi | G06F 3/0412 |
| 2020/0387259 A1* | 12/2020 | Krah | G06F 3/03545 |
| 2021/0019021 A1* | 1/2021 | Zhang | G06F 3/04166 |
| 2021/0071917 A1* | 3/2021 | Pei | F25B 21/00 |
| 2021/0181886 A1* | 6/2021 | Hua | G06F 3/0443 |
| 2021/0183891 A1* | 6/2021 | Sun | G02F 1/13338 |

FOREIGN PATENT DOCUMENTS

| | | |
|---|---|---|
| KR | 10-2017-0078466 A | 7/2017 |
| KR | 10-2017-0092865 A | 8/2017 |
| KR | 10-2017-0111827 A | 10/2017 |
| KR | 10-2017-0120261 A | 10/2017 |

\* cited by examiner

FLEXIBLE DISPLAY AND ELECTRONIC DEVICE EQUIPPED WITH SAME

CROSS-REFERENCE TO RELATED APPLICATION(S)

This application is a National Phase Entry of PCT International Application No. PCT/KR2019/005002, which was filed on Apr. 25, 2019, and claims priority to Korean Patent Application No. 10-2018-0048031, which was filed on Apr. 25, 2018, the contents of which are incorporated herein by reference.

TECHNICAL FIELD

The disclosure relates to a flexible display and an electronic device including the same.

BACKGROUND ART

In recent years, portable electronic devices have been developed to satisfy consumer preferences. In particular, for aesthetics, portable electronic devices are gradually made slim and compact in appearance. However, displays having sufficient sizes are required for an improvement in user convenience. To extend a display area, a flexible display having flexibility may be employed for a compact electronic device.

DISCLOSURE

Technical Problem

When the flexible display is used in a rolled state, an unnecessary touch input may be applied to a touch sensor layer in a rolled area by a user's hand or a case.

To process the unnecessary touch input, software such as firmware may be used. However, the unnecessary touch input may not be completely prevented, and power consumption may be increased.

Embodiments of the disclosure provide a flexible display and an electronic device for solving the aforementioned problems.

Technical Solution

In accordance with an aspect of the disclosure, a flexible display having a first area and a second area extending from the first area in a first direction includes a display panel including a pixel array, a touch sensor layer including a first electrode disposed in the first area and a second electrode disposed in the second area, and a switch that electrically connects the first electrode and the second electrode.

In accordance with another aspect of the disclosure, an electronic device includes a flexible display including a first area and a second area extending from the first area in one direction, a first structure having at least part of the flexible display disposed on a first surface thereof, a second structure coupled to the first structure so as to slide in one direction relative to the first structure, the remaining part of the flexible display being disposed in the second structure, and a processor electrically connected with the flexible display. The second structure slides relative to the first structure between an open state and a closed state. A distance between an end portion of the first structure in one direction and an end portion of the second structure in one direction is increased when the second structure moves from the closed state to the open state. In the open state, the first area is disposed on the first surface of the first structure, and the second area is disposed inside the second structure. The second area is pulled into the second structure to form the first surface together with the first area when the second structure moves from the closed state to the open state. The flexible display includes a display panel, a touch sensor layer that is formed over the display panel and that includes a first electrode disposed in the first area and a second electrode disposed in the second area, and a switch that electrically opens or short-circuits the first electrode and the second electrode. The processor controls the switch to electrically open the first electrode and the second electrode when the second structure moves from the open state to the closed state.

Advantageous Effects

According to the exemplary embodiments of the disclosure, an unnecessary touch input may be prevented from being applied to a rolled area of the flexible display.

In addition, the disclosure may provide various effects that are directly or indirectly recognized.

MODE FOR INVENTION

Figure 1A:
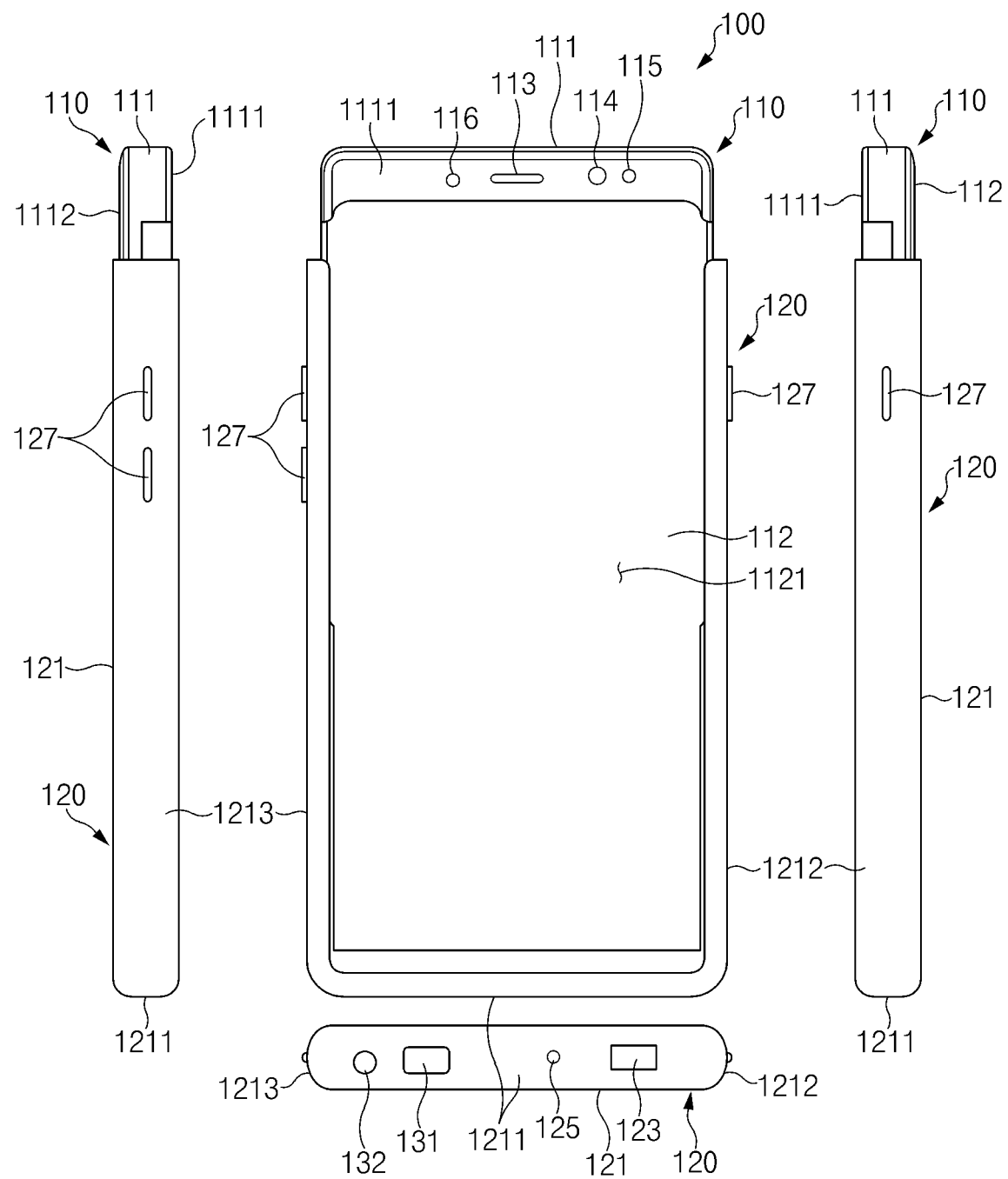
FIG. 1A is a front perspective view of a closed state of an electronic device according to an embodiment.
Figure 1B:
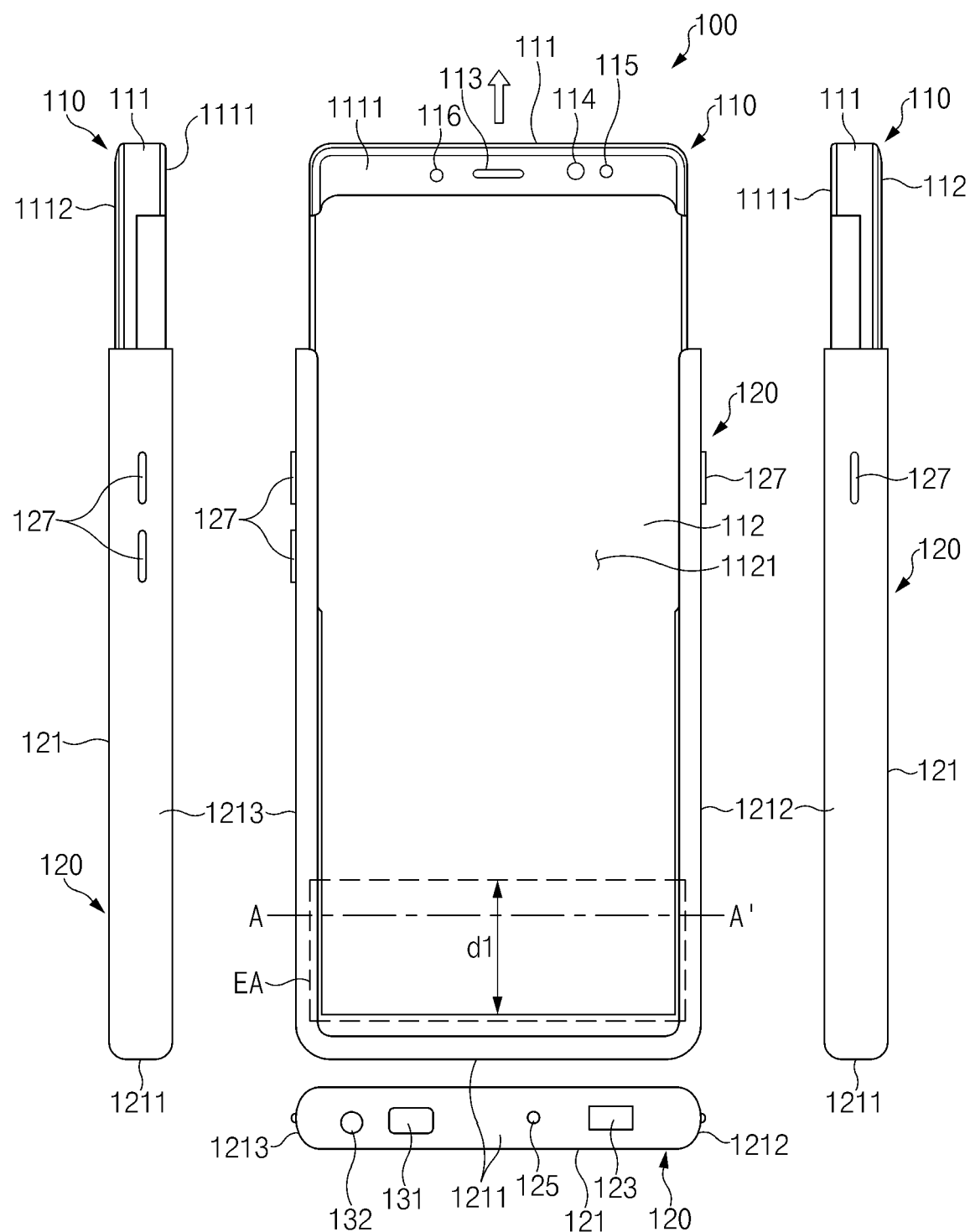
FIG. 1B is a front perspective view of an open state of the electronic device of FIG. 1.
Figure 1C:
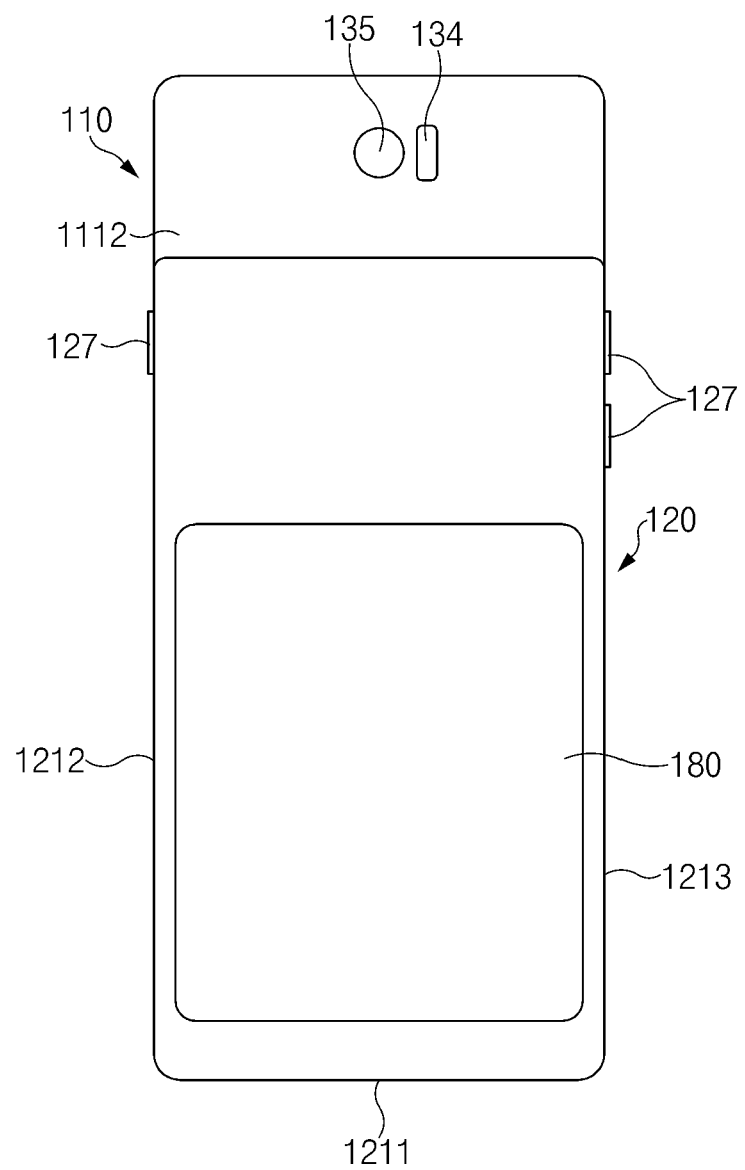
FIG. 1C is a rear perspective view of the electronic device of FIG. 1.

FIGS. 1A and 1B are views illustrating an open state and a closed state of an electronic device according to various embodiments of the disclosure. FIG. 1C is a rear perspective view of the electronic device according to various embodiments of the disclosure.

FIG. 1A illustrates a state in which a first structure 110 is closed with respect to a second structure 120, and FIG. 1B illustrates a state in which the first structure 110 is open with respect to the second structure 120.

Referring to FIGS. 1A, 1B, and 1C, the electronic device 100 may include the first structure 110 and the second structure 120 disposed so as to be movable relative to the first structure 110. According to an embodiment, the first structure 110 may be disposed to perform reciprocating motion by a predetermined distance d1 in the illustrated directions relative to the second structure 120.

According to various embodiments, a first plate 111 of the first structure 110 may include a first surface 1111 and a second surface 1112 facing away from the first surface 1111. According to an embodiment, the second structure 120 may include a second plate 121, a first sidewall 1211 extending from the second plate 121, a second sidewall 1212 extending from the first sidewall 1211 and the second plate 121, and a third sidewall 1213 that extends from the first sidewall 1211 and the second plate 121 and that is parallel to the second sidewall 1212, or a second back plate 180 (e.g., a rear window). According to an embodiment, to accommodate at least part of the first structure 110, the second plate 121, the first sidewall 1211, the second sidewall 1212, and the third sidewall 1213 may be formed to be open at one side. According to an embodiment, the second sidewall 1212 or the third sidewall 1213 may be omitted. According to an embodiment, the second plate 121, the first sidewall 1211, the second sidewall 1212, and the third sidewall 1213 may be formed in an integrated structure. In another example, the second plate 121, the first sidewall 1211, the second sidewall 1212, and the third sidewall 1213 may be formed of separate structures, respectively, and may be combined together. According to an embodiment, the second back plate 180 may cover at least part of a display 112.

According to an embodiment, the first structure 110 is movable to the open state and the closed state relative to the second structure 120 in a first direction (e.g., direction □) parallel to the second plate 121 and the second sidewall 1212. The first structure 110 may move so as to be located a first distance from the first sidewall 1211 in the closed state and a second distance greater than the first distance from the first sidewall 1211 in the open state.

According to an embodiment, the electronic device 100 may include at least one of the display 112, audio modules 113 and 123, camera modules 115 and 135, an indicator 116 (e.g., an LED device), sensor modules 114 and 134, key input devices 127, or connector holes 131 and 132.

According to an embodiment, the display 112 may include a planar portion 1121 that extends across at least part of the first surface 1111 and that is disposed on the first surface 1111 and a bendable portion that extends from the planar portion 1121 into a space between the first sidewall 1211 and the first structure 110 in the closed state. According to an embodiment, when viewed from above the first plate 111, at least part of the bendable portion of the display may be configured to move toward the planar portion by a predetermined display area E1 so as to form a substantially flat surface between the planar portion 1121 and the first sidewall 1211 in a case where the first structure 110 is moved from the closed state to the open state. The display 112 may be combined with, or disposed adjacent to, touch sensing circuitry, a pressure sensor for measuring the intensity (pressure) of a touch, and/or a digitizer for detecting a stylus pen of a magnetic type.

According to an embodiment, the audio modules 113, 123, and 125 may include the speaker holes 113 and 123 or the microphone hole 125. The speaker holes 113 and 123 may include the receiver hole 113 or the external speaker hole 123. A microphone for obtaining a sound from the outside may be disposed in the microphone hole 125, and in some embodiments, a plurality of microphones may be disposed in the microphone hole 125 to detect the direction of a sound. In some embodiments, the speaker holes 113 and 123 and the microphone hole 125 may be implemented with one hole, or a speaker may be included without the speaker holes 113 and 123 (e.g., a piezo speaker). According to an embodiment, the receiver hole 113 may be disposed in the first structure 110, and the external speaker hole 123 or the microphone hole 125 may be disposed in the second structure 120. According to another embodiment, the external speaker hole 123 may be disposed in the second surface 1112 of the first plate 111 or a side surface of the first structure 110. According to another embodiment, the microphone hole 125 may be disposed in a side surface of the first structure 110.

According to an embodiment, the sensor modules 114 and 134 may generate an electrical signal or a data value that corresponds to an operational state inside the electronic device 100 or an environmental state external to the electronic device 100. The sensor modules 114 and 134 may include, for example, the first sensor module 114 (e.g., a proximity sensor) that is disposed on the first surface 1111 of the first plate 111, and/or the second sensor module (not illustrated) (e.g., a fingerprint sensor) and/or the third sensor module 134 (e.g., an HRM sensor) that is disposed on the second surface 1112 of the first plate 111. The electronic device 100 may further include a non-illustrated sensor module, which may be, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 115 and 135 may include the first camera device 115 disposed on the first surface 1111 of the first plate 111 and the second camera device 135 disposed on the second surface 1112. The first camera device 115 or the second camera device 135 may include one or more lenses, an image sensor, and/or an image signal processor. According to an embodiment, the second camera device 135 may be disposed on one surface of the second structure 120.

According to an embodiment, the key input devices 127 may be disposed on the second sidewall 1212 or the third sidewall 1213 of the second structure 120. The electronic device 100 may include a non-illustrated key input device, which may be, for example, a home key button or a touch pad disposed around the home key button. According to another embodiment, at least a part of the key input devices 127 may be located in one area of the first structure 110.

According to an embodiment, the indicator 116 may be disposed on the first surface 1111 of the first plate 111. For example, the indicator 116 may provide state information of the electronic device 100 in the form of light and may include an LED.

According to an embodiment, the connector holes 131 and 132 may include the first connector hole 131 for accommodating a connector (e.g., a USB connector) for transmitting and receiving power and/or data with an external electronic device, and/or the second connector hole (or, the earphone jack) 132 for accommodating a connector for transmitting and receiving audio signals with an external electronic device. According to an embodiment, the first connector hole 131 or the second connector hole 132 may be disposed in the first sidewall 1211 of the second structure 120. According to another embodiment, the first connector hole 131 or the second connector hole 132 may be formed in a sidewall of the first structure 110.

Figure 2:
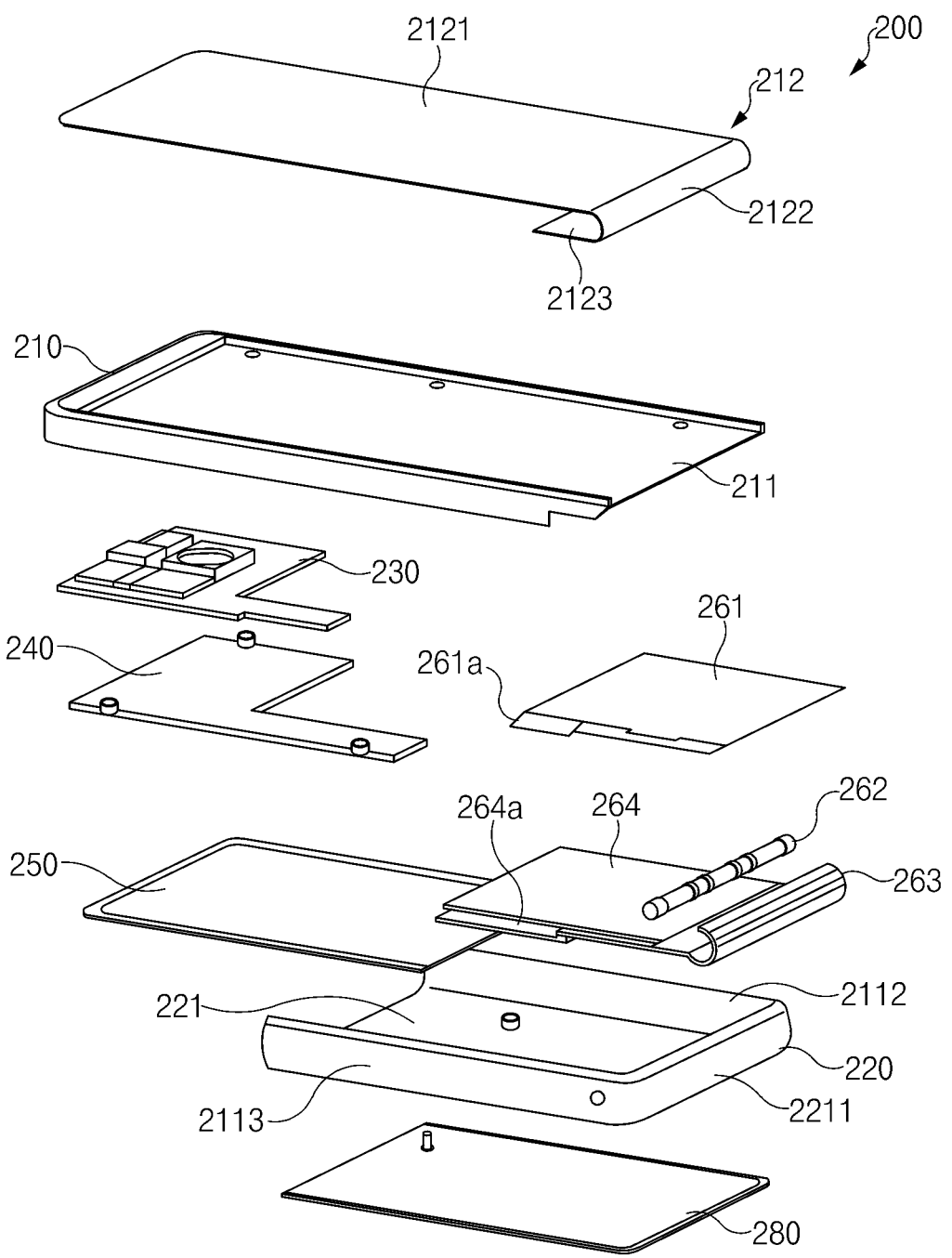
FIG. 2 is an exploded perspective view of the electronic device of FIG. 1.

FIG. 2 is an exploded perspective view of an electronic device according to various embodiments of the disclosure.

Referring to FIG. 2, the electronic device 200 may include a display 212, a first structure 210, a first plate 211, a second structure 220, a second plate 221, a printed circuit board 230, a support member 240 (e.g., a rear case), a first back plate 250, a first hinge plate 261, a roller 262, a second hinge plate 264, or a second back plate 280 (e.g., a rear window). In some embodiments, the electronic device 200 may omit at least one component (e.g., the first support member 240 or the first back plate 250) among the aforementioned components, or may additionally include other component(s).

The display 212 may include a first surface 2121, a second surface 2122, and a third surface 2123, and a screen display area may be changed based on an exposed area according to various embodiments. The first surface 2121 and the third surface 2123 may form flat surfaces, and the second surface 2122 may form a curved surface.

The first structure 210 may include the first plate 211. The first structure 210 may be formed of, for example, a metallic material and/or a nonmetallic (e.g., polymer) material. The display 212 may be coupled to one surface of the first plate 211, and the printed circuit board 230 may be coupled to an opposite surface of the first plate 211. The first plate 211 may be connected with one side of a multi-bar 263 that is at least connected with the second surface 2122 of the display 212. The first structure 210 may fix the second hinge plate 264.

The first hinge plate 261 may support the multi-bar 263 when the display 212 is extended. The first hinge plate 261 and a first hinge plate fixing portion 261a may be integrally formed with each other. The first hinge plate fixing portion 261a may be connected to a second hinge plate fixing portion 264a included in the second hinge plate 264.

The roller 262 may guide or support the multi-bar 263 to move the multi-bar 263 at a predetermined radius. The roller 262 may be connected to the second hinge plate fixing portion 264a or the first hinge plate 261.

The multi-bar 263 may be formed of a plurality of straight rods. The multi-bar 263 may support at least part of the second surface 2122 of the display 212. One side of the multi-bar 263 may be connected to the second hinge plate 264, and an opposite side of the multi-bar 263 may be connected to the first structure 210.

The second hinge plate 264 may support the third surface 2123 of the display 212. When the display 212 is extended, the second hinge plate 264 may be moved in conjunction with the multi-bar 263 such that a screen is extended. The second hinge plate 264 may be formed of a part separate from the second hinge plate fixing portion 264a. The second hinge plate 264 may be fixed to the first structure 210 such that the second hinge plate 264 slides.

The second structure 220 may be formed to surround at least part of the first structure 210, the second hinge plate 264, the multi-bar 263, and the like. According to an embodiment, the second structure 220 may include the second plate 221, a first sidewall 2211 extending from the second plate 221, a second sidewall 2212 extending from the first sidewall 2211 and the second plate 221, and a third sidewall 2213 that extends from the first sidewall 2211 and the second plate 221 and that is parallel to the second sidewall 2212. The second structure 220 may form a space for accommodating a component, such as an antenna, in a space not overlapping the multi-bar 263. The second structure 220 may include the second back plate 280 that covers at least part of the third surface 2123 of the display 212.

The second back plate 280 may contain a material that does not transmit light when it is not necessary to display information on the third surface 2123 of the display 212. In another example, the second back plate 280 may be formed of a light-transmitting material so as to display information on the third surface 2123 of the display 212. The second back plate 280 may be integrally formed with the second structure 220.

The support member 240 may be disposed between the printed circuit board 230 and the first back plate 250.

A processor, a memory, and/or an interface may be mounted on the printed circuit board 230. The processor may include, for example, one or more of a central processing unit, an application processor, a graphic processing unit, an image signal processor, a sensor hub processor, or a communication processor. In a case where the display 212 is extended or reduced, the first structure 210 may move by being guided through the first hinge plate 261.

The memory may include, for example, a volatile memory or a nonvolatile memory.

The interface may include, for example, a high definition multimedia interface (HDMI), a universal serial bus (USB) interface, an SD card interface, and/or an audio interface. For example, the interface may electrically or physically connect the electronic device 200 with an external electronic device and may include a USB connector, an SD card/MMC connector, or an audio connector.

Figure 3A:
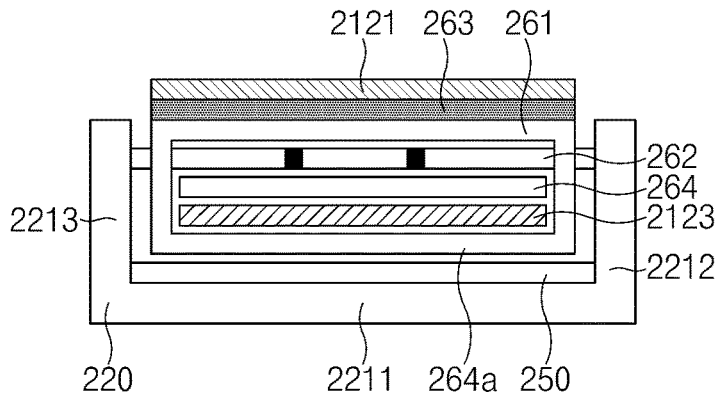
FIG. 3 is a view illustrating operation of the electronic device according to an embodiment of the disclosure.
Figure 3B:
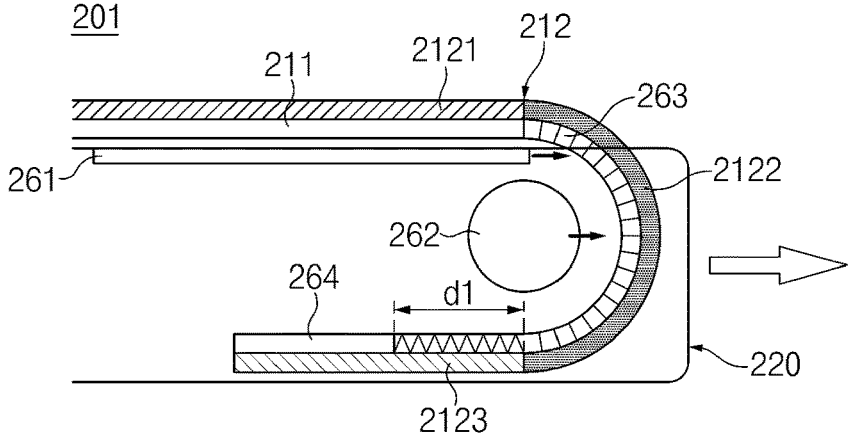
Figure 3C:
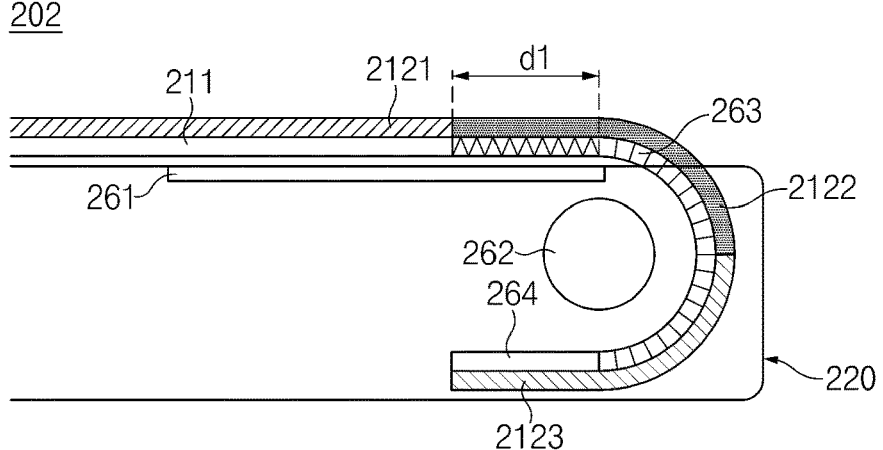

FIG. 3 is a view illustrating operation of the electronic device according to an embodiment.

FIG. 3 (a) is a sectional view taken along line A-A' of FIG. 1B. FIG. 3 (b) is a view illustrating a closed state of the electronic device according to an embodiment. FIG. 3 (c) is a view illustrating an open state of the electronic device according to an embodiment.

Referring to FIG. 3 (a), the second plate 221, the second hinge plate fixing portion 264a, the flexible display 212, the second hinge plate 264, the roller 262, the first hinge plate 261, and the multi-bar 263 may be disposed in the second structure 220.

As described above, between the closed state (FIG. 3 (b)) and the open state (FIG. 3 (a)) of the electronic device 200, the second structure 220 may slide relative to the first structure 210. The first hinge plate 261, the second hinge plate fixing portion 264a, and the roller 262 may be connected to the second structure 220. That is, as illustrated in FIG. 3 (b), the first hinge plate 261, the second hinge plate fixing portion 264a, and the roller 262 may move together with the second structure.

In contrast, one side of the first surface 2121 of the flexible display 212 may be connected with the first plate 211 formed in the first structure 210, and an opposite side of the first surface 2121 of the flexible display 212 may be connected with the multi-bar 263. Furthermore, the second hinge plate 264 may be connected with the multi-bar 263. In addition, the third surface 2123 of the flexible display 212 may be seated or supported on the multi-bar 263 and may move together the multi-bar 263. Accordingly, the flexible display 212, the multi-bar 263, and the second hinge plate 264 may be connected to the first structure 210. The flexible display 212, the multi-bar 263, and the second hinge plate 264 may not move together with the second structure 220.

As illustrated in FIG. 3 (b), the electronic device 200 may include the flexible display 212, the first plate 211 formed in the first structure 210, the multi-bar 263 connected to the first plate 211, and the second hinge plate 264 connected with the multi-bar 263. The first plate 211, the multi-bar 263, and the second hinge plate 264 may support the flexible display 212.

The flexible display 212 may include the first surface 2121 that is formed to be a flat surface and that forms a front surface of the electronic device 200, the second surface 2122 that extends from the first surface 2121 and that is formed to be a flat surface or a curved surface, and the third surface 2123 that extends from the second surface 2122 and that is formed to be a flat surface.

In the closed state (FIG. 3 (b)), the first surface 2121 may be formed to be a flat surface, the second surface 2122 may be formed to be a curved surface, and the third surface 2123 may be formed to be a flat surface. The first surface 2121 may form the front surface of the electronic device 200, and the third surface 2123 may be disposed in the electronic device 200 (e.g., the second structure 220).

Between the closed state (FIG. 3 (b)) and the open state (FIG. 3 (a)), the second surface 2122 may be at least partially formed to be a flat surface and may form part of the front surface of the electronic device 200. The third surface 2123 may be at least partially formed to be a curved surface and may be accommodated in the second structure 220 of the electronic device 200.

As described above, the electronic device 200 may move from the closed state (FIG. 3(b)) to the open state (FIG. 3 (a)) in a case where the second structure 220 slides relative to the first structure 210 in the direction of an arrow.

In the sliding operation, the second structure 220 may move together with the roller 262 and the first hinge plate 261. The roller 262 and the first hinge plate 261 may be coupled to the second structure 220 so as to be movable together. In a state between the closed state and the open state and in the open state (FIG. 3(a)), the first hinge plate 261 may support at least part of the flexible display 212.

In contrast, the first plate 211, the multi-bar 263, and the second hinge plate 264 may be coupled to the first structure 210 and may be fixed in position irrespective of the sliding operation of the second structure 220.

In the illustrated embodiment, the flexible display 212 may be deformed depending on states. For example, in the open state and the closed state, the first surface 2121 of the flexible display 212 may be formed to be a flat surface. In this case, the first surface 2121 may be disposed on the first plate 211. For example, in the open state (FIG. 3(a)), the second surface 2122 may be formed to be a flat surface, and in the closed state (FIG. 3 (b)), part of the second surface 2122 may be formed to be a flat surface, and the remaining part may be formed to be a curved surface. In this case, the flat surface area of the second surface 2122 may be disposed on the first plate 211. For example, in the open state (FIG. 3(a)), the third surface 2123 may be formed to be a flat surface, and in the closed state (FIG. 3 (b)), part of the third surface 2123 may be formed to be a curved surface, and the remaining part may be formed to be a flat surface.

Hereinafter, a flexible display 300 according to another embodiment of the disclosure will be described in detail with reference to FIGS. 4 to 9.

Figure 4:
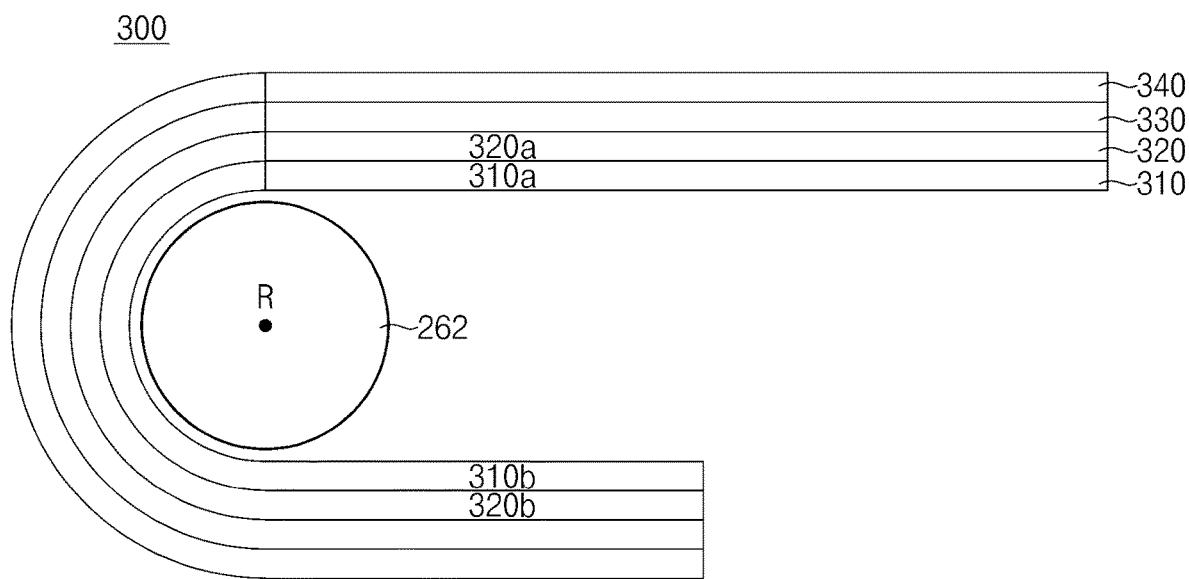
FIG. 4 is a sectional view of a flexible display according to another embodiment of the disclosure.

FIG. 4 is a sectional view of the flexible display 300 according to the other embodiment of the disclosure. The flexible display 300 may include a first area 300a and a second area 300b extending from the first area 300a in one direction.

A surface located at the top with respect to the first area 300a of the flexible display 300 illustrated in FIG. 4 is referred to as a front surface of the flexible display 300, and an opposite surface is referred to as a rear surface of the flexible display 300.

"R" may refer to a rolling axis R of a roller 262. At least part of the flexible display 300 may be deformed from a flat surface to a curved surface or from a curved surface to a flat surface by the roller 262 rotating about the rolling axis R.

The first area 300a may include the first surface 2121 of FIG. 2. The second area 300b may include the second surface 2122 and the third surface 2123 of FIG. 2. The first area 300a may be formed to be a flat surface, and part of the second area 300b may be formed to be a curved surface. However, the second area 300b is not necessarily limited to including a curved surface or being formed to be a curved surface, and likewise to the first area 300a, the second area 300b may be formed to be a flat surface depending on a state (e.g., a closed state or an open state) of the electronic device. In a case where the second area 300b is formed to be a flat surface, the second area 300b may be formed to be the same flat surface extending from the first area 300a.

In a case where the electronic device 200 moves between the closed state 201 and the open state 202, at least part of the second area 300b may be deformed from a curved surface to a flat surface.

The second area 300b may have a higher degree of bending than the first area 300a. The second area 300b may have such a degree of bending that the second area 300b is bendable, rollable, or foldable. That is, the second area 300b may be deformed to have various curvatures.

Referring to FIG. 4, the flexible display 300 according to the other embodiment of the disclosure may include a plurality of layers. The plurality of layers may be stacked one above another.

The plurality of layers may include a display panel 310, a touch sensor layer 320, a polarization layer 330, and a glass layer 340. The plurality of layers may extend in the first area 300a and the second area 300b.

The display panel 310 may form the second surface of the flexible display 300. In this case, the display panel 310 may include a third area 310a included in the first area 300a of the flexible display 300 and a fourth area 310b included in the second area 300b of the flexible display 300.

The touch sensor layer 320 may be stacked on the display panel 310. The touch sensor layer 320 may transmit light generated from the display panel 310 and may detect the coordinates of a touch operation of a user. The touch sensor layer 320 may include a fifth area 320a included in the first area 300a of the flexible display 300 and a sixth area 320b included in the second area 300b of the flexible display 300.

The polarization layer 330 may be stacked on the touch sensor layer 320. The polarization layer 330 may extend in the first area 300a and the second area 300b. The polarization layer 330 may be attached to the touch sensor layer 320 through an OCA. The polarization layer 330 may prevent reflection of external light to ensure visibility in a bright place. For example, the polarization layer 330 may pass only light waves oscillating in one direction among light waves incident through the glass layer 340, thereby improving the user's visibility. The polarization layer 330 may include, for example, a poly ethylene terephthalate (PET) film, a tri-acetyl cellulose (TAC) film, a cycle-olefin polymer (COP) film, or a poly-vinyl alcohol (PVA) film.

The glass layer 340 may form the first surface of the display. The glass layer 340 may be formed to protect the other layers from external shocks. The glass layer 340 may extend in the first area 300*a* and the second area 300*b*. The glass layer 340 may be formed of a light-transmitting material capable of passing light emitted from the display panel 310.

Figure 5A:
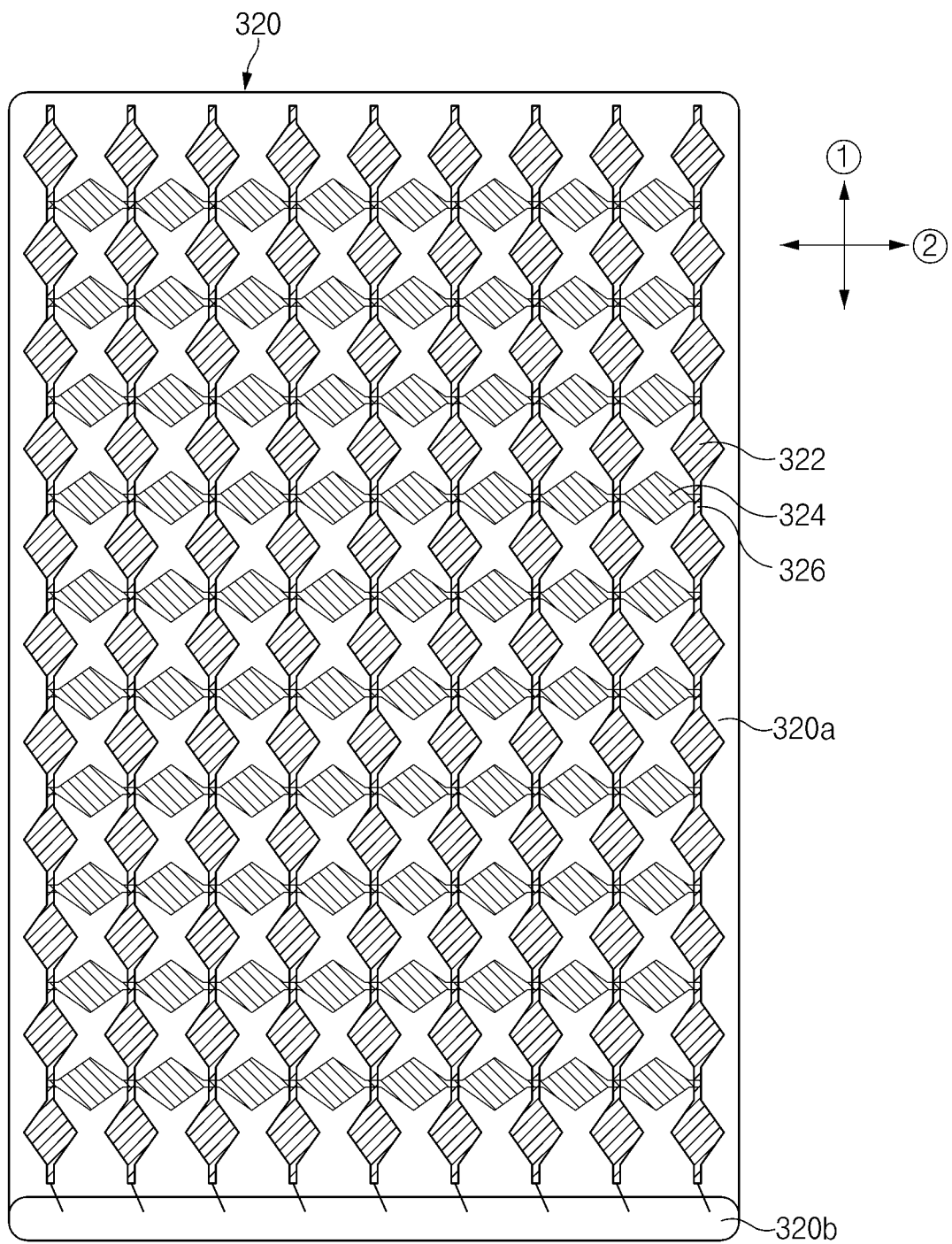
FIGS. 5A and 5B are a plan view of a touch sensor layer and a sectional view of the flexible display in a case where part of a rigid area of the flexible display according to the other embodiment of the disclosure is formed to be a curved surface.
Figure 5B:
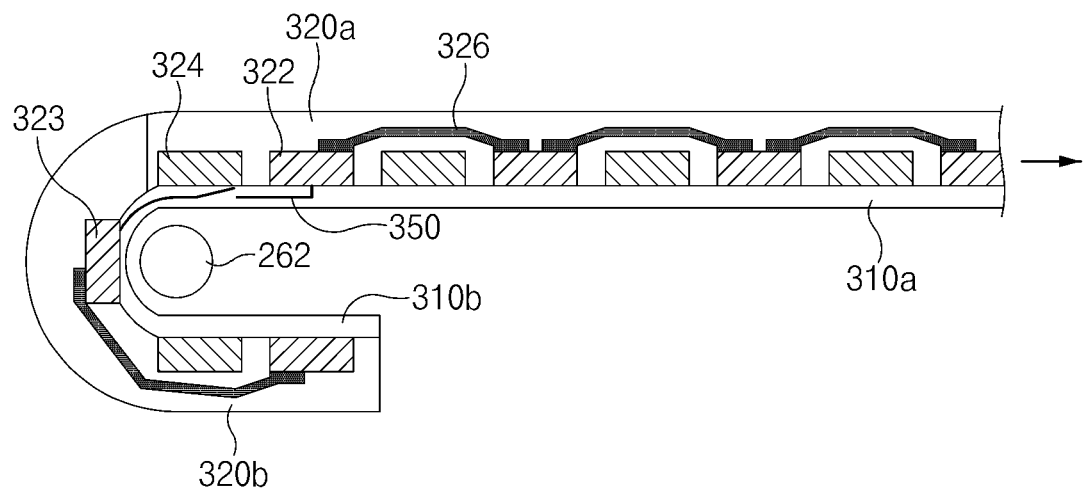

FIGS. 5A and 5B are a plan view of the touch sensor layer 320 and a sectional view of the flexible display in a case where at least part of the second area 300*b* is formed to be a curved surface in the other embodiment of the disclosure.

Based on FIG. 5A, the longitudinal direction of the touch sensor layer 320 is defined as a first direction, and the direction perpendicular to the first direction is defined as a second direction. In this case, the first direction may be a direction in which the fourth area 320*b* extends from the third area 320*a* of the display panel 320.

Referring to FIG. 5A, a touch sensor array may be formed in the touch sensor layer 320 of the flexible display 300 according to the other embodiment of the disclosure. The touch sensor array may include a plurality of touch electrodes 322 and 324.

The plurality of touch electrodes may include the first touch electrodes 322 and the second touch electrodes 324. In this case, the first touch electrodes 322 and the second touch electrodes 324 may be formed in the same layer or in different layers. The positions or arrangements of the first touch electrodes 322 and the second touch electrodes 324 are not limited to the embodiment illustrated in the drawing.

The first touch electrodes 322 may be arranged in the first direction. The second touch electrodes 324 may be arranged in the second direction. The first touch electrodes 322 may be connected together through bridges 326 so as not to be connected with the second touch electrodes 324, and therefore the first touch electrodes 322 and the second touch electrodes 324 may be electrically isolated from each other.

As illustrated in the drawing, the first touch electrodes 322 and the second touch electrodes 324 may be formed in a diamond shape. However, the shape of the electrodes illustrated in the drawing is merely one example, and the first touch electrodes 322 and the second touch electrodes 324 may be formed in various shapes.

Referring to FIG. 5B, in a case where the electronic device 200 is in the closed state 201, the fourth area 310*b* of the display panel 310 and the sixth area 320*b* of the touch sensor layer 320, which are included in the second area 300*b*, may be formed to be a flat surface. In contrast, the third area 310*a* of the display panel 310 and the fifth area 320*a* of the touch sensor layer 320, which are included in the first area 300*a*, may be at least partially formed to be a curved surface.

The first touch electrodes 322 of the touch sensor layer 320 may be electrically connected together through the bridges 326. In contrast, the second touch electrodes 324 may be electrically connected together on the touch sensor layer 320. In this case, the first touch electrodes 322 may be connected together in the first direction, and the second touch electrodes 324 may be connected together in the second direction. In this case, one of the first touch electrodes 322 and the second touch electrodes 324 may be connected through the bridges 326 and may not be electrically connected with the other.

The flexible display 300 according to the other embodiment of the disclosure may further include switches 350 that electrically connect the fifth area 320*a* and the sixth area 320*b* of the touch sensor layer.

In various embodiments, the switches 350 may be located in the touch sensor layer 320. Alternatively, the switches 350 may be disposed inside the display panel 310. In the case where the switches 350 are disposed inside the display panel 310, the switches 350 may be formed of a thin film transistor.

The switches 350 may connect the first touch electrodes 322 in the fifth area 320*a* formed to be a flat surface and third touch electrodes 323 in the sixth area 320*b* formed to be a curved surface.

The switches 350 illustrated in FIG. 5B are in an open state, and the first touch electrodes 322 in the fifth area 320*a* and the third touch electrodes 323 in the sixth area 320*b* may not be electrically connected. That is, a touch function may not operate in the second area 300*b* of the flexible display 300.

In the closed state, the second area 300*b* of the flexible display 300 may be disposed inside the electronic device. In this case, an unnecessary touch for the second area 300*b* may be generated by a back cover of the electronic device or a touch of a user. To prevent this problem, the flexible display 300 according to the disclosed embodiment may include the switches 350 configured to interrupt the supply of power to the touch electrodes 323 included in the sixth area 320*b* in the closed state.

Figure 6A:
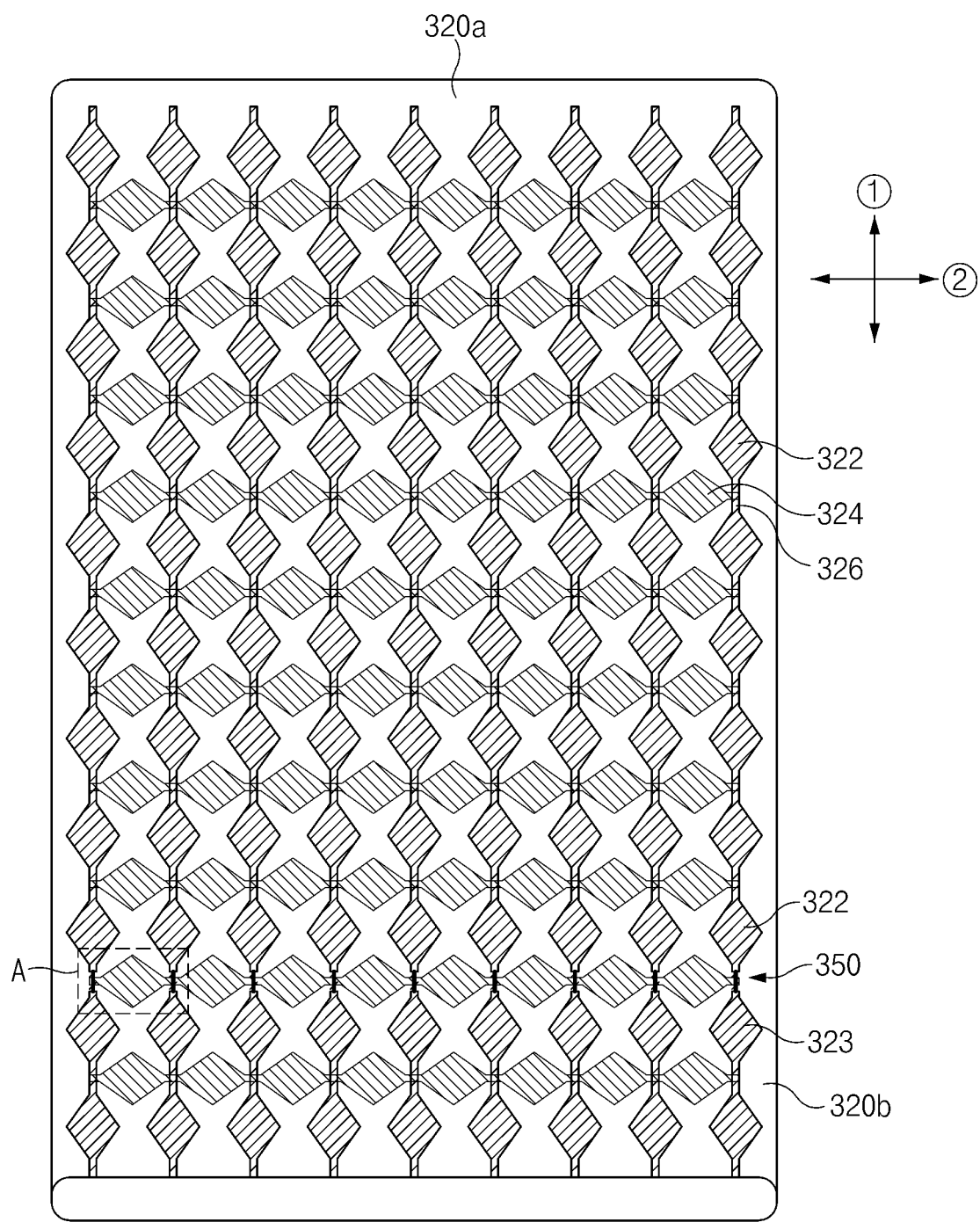
FIGS. 6A and 6B are a plan view of the touch sensor layer and a sectional view of the flexible display in a case where a flexible area is formed to be a flat surface.
Figure 6B:
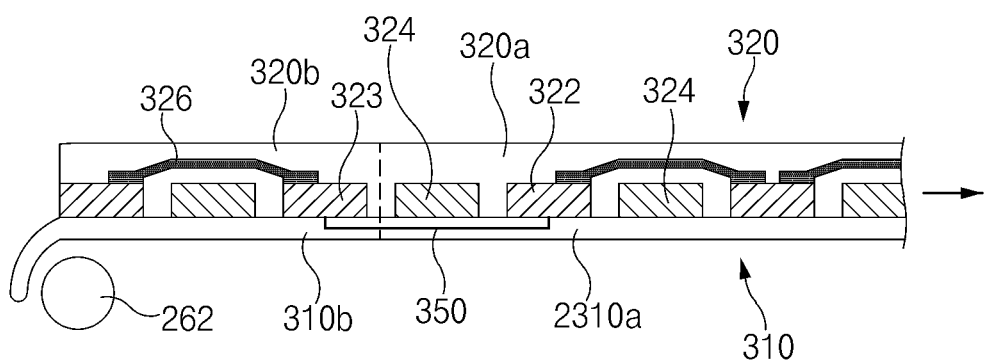

FIGS. 6A and 6B are a plan view of the touch sensor layer 320 and a sectional view of the flexible display 300 in a case where the first area 300*a* and at least part of the curved surface of the second area 300*b* are deformed to be a flat surface.

As described above, the fifth area 320*a* corresponding to the first area 300*a* and at least part of the sixth area 320*b* corresponding to the second area 300*b* may be formed to be the same flat surface. The flexible display 300 may include the switches 350 for connecting the first touch electrodes 322 and the third touch electrodes 323.

Although the switches 350 are illustrated as electrically connecting the first touch electrodes 322 included in the fifth area 320*a* and the third touch electrodes 323 included in the sixth area 320*b*, the switches 350 are not necessarily limited to the first touch electrodes 322 and the third touch electrodes 323. For example, the switches 350 may include various switch structures capable of opening and closing leads included in the first area 300*a* and leads included in the second area 300*b*.

Referring to FIG. 6A, the switches 350 may include a plurality of sub-switches. The sub-switches may be arranged along the second direction of the touch sensor layer 320. As many sub-switches as the columns of touch electrodes arranged in the first direction may be formed. In FIG. 5A, nine columns of touch electrodes are illustrated, and the switches 350 may include nine sub-switches to correspond to the nine columns of touch electrodes.

The numbers of rows and columns of touch electrodes may vary depending on the sensitivity of a touch sensor and the size of the flexible display 300 and are not limited to those illustrated in the drawing.

Referring to FIG. 6B, both the first area 300*a* and the second area 300*b* of the flexible display 300 may be formed to be a flat surface. The fifth area 320*a* of the touch sensor layer 320 may be electrically connected with the sixth area 320*b* of the touch sensor layer 320 by the switches 350.

Figure 7:
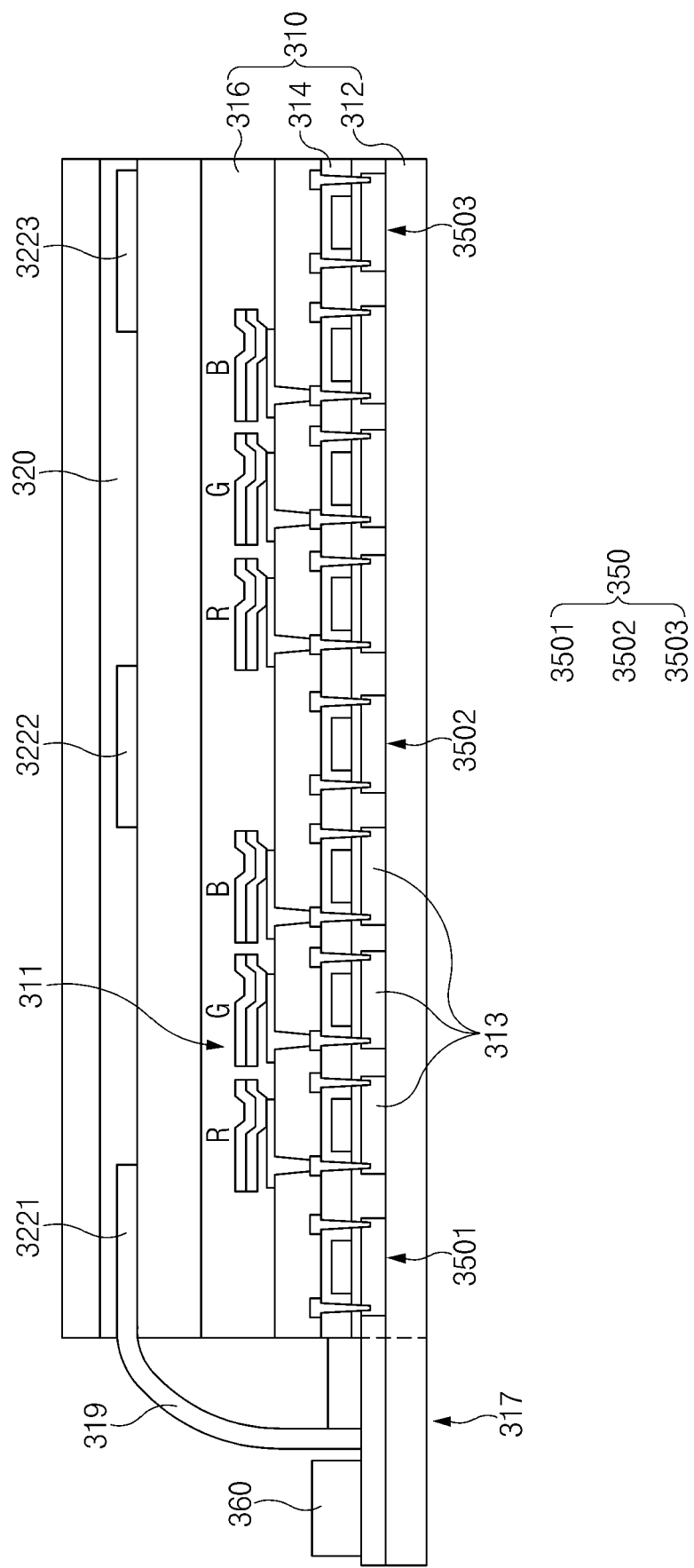
FIG. 7 is a sectional view of area A illustrated in FIG. 6A, where the cross-section is taken along line B-B'.

FIG. 7 is a sectional view of area A illustrated in FIG. 6A. The display panel 310 of the flexible display 300 according to the other embodiment of the disclosure may include a substrate 312, a thin film transistor layer 314 formed on the substrate 312, a pixel array R, G, and B formed on the thin film transistor layer 134, and a thin film encapsulation layer 316 covering the pixel array.

The substrate 312 may be implemented in various forms. The substrate 312 may be formed of a flexible substrate, which is made of a flexible material, so as to be foldable, bendable, or rollable.

The thin film transistor layer 134 may be formed on the substrate 312. The thin film transistor layer 314 may be formed in a thin film form. The thin film transistor layer 314 may include a plurality of thin film transistors 313. The transistors 313 may be electrically connected to light emitting diodes that form the pixel array.

The pixel array may include the plurality of light emitting diodes that form pixels. One pixel 311 may include at least three sub-pixels. As illustrated in FIG. 6, the three sub-pixels may display RGB colors. Three or more light emitting diodes may be included in the one pixel 311. At least three transistors 313 may be provided to correspond to the light emitting diodes.

In the other embodiment of the disclosure, the switches 350 may be formed in the thin film transistor layer 314. In this case, the switches 350 and the sub-switches may be implemented with a thin film transistor. As illustrated in FIG. 6, the switches 350 may be formed on the same layer as the thin film transistors 313 connected to the light emitting diodes.

In various embodiments, the switches 350 may be disposed in the touch sensor layer 320.

As illustrated in FIG. 7, the display panel 310 may further include an outer portion 317 that extends outside the display panel 310 and the touch sensor layer 320 from the substrate 312.

A driver IC 360 for driving the touch sensor and the display panel 310 may be disposed on the outer portion 317. The driver IC 360 may include a DDI for driving the pixel array and a TSP IC for controlling the touch sensor.

A plurality of switches 3501, 3502, and 3503 formed in the thin film transistor layer 314 may be connected with touch electrodes 3221, 3222, and 3223 of the touch sensor layer 320. In this case, the thin film encapsulation layer 316 may be disposed between the touch sensor layer 320 and the pixel array. Input terminals and output terminals of the switches 350 may extend outside the display panel 310 and may be connected with the touch electrodes by wire bonding 319. Accordingly, a problem arising when the switches and the touch electrodes are connected through via-holes formed through the thin film encapsulation layer 316 may be solved. For example, moisture or air may infiltrate into the light emitting diodes through the via-holes formed through the thin film encapsulation layer 316.

The thin film encapsulation layer 316 may be formed on the thin film transistor layer 314 to encapsulate the pixel array formed on the thin film transistor layer 314. The thin film encapsulation layer 316 may prevent infiltration of air and moisture between the plurality of light emitting diodes. The thin film encapsulation layer 316 may be formed of a thin film encapsulation (TFE) film. The thin film encapsulation film may protect the plurality of light emitting diodes from moisture or oxygen by forming, for example, a plurality of organic layers and/or inorganic layers.

The touch sensor layer 320 including the plurality of touch electrodes may be stacked on the thin film encapsulation layer 316. In the touch sensor layer 320, the first touch electrodes 322 disposed in one direction and the second touch electrodes 324 disposed in a direction across the one direction may be formed on the same layer or different layers.

The polarization layer 330 may be stacked on the touch sensor layer 320, and the glass layer 340 may be stacked on the polarization layer 330. The polarization layer 330 and the glass layer 340 are as described with reference to FIG. 4.

Figure 8:
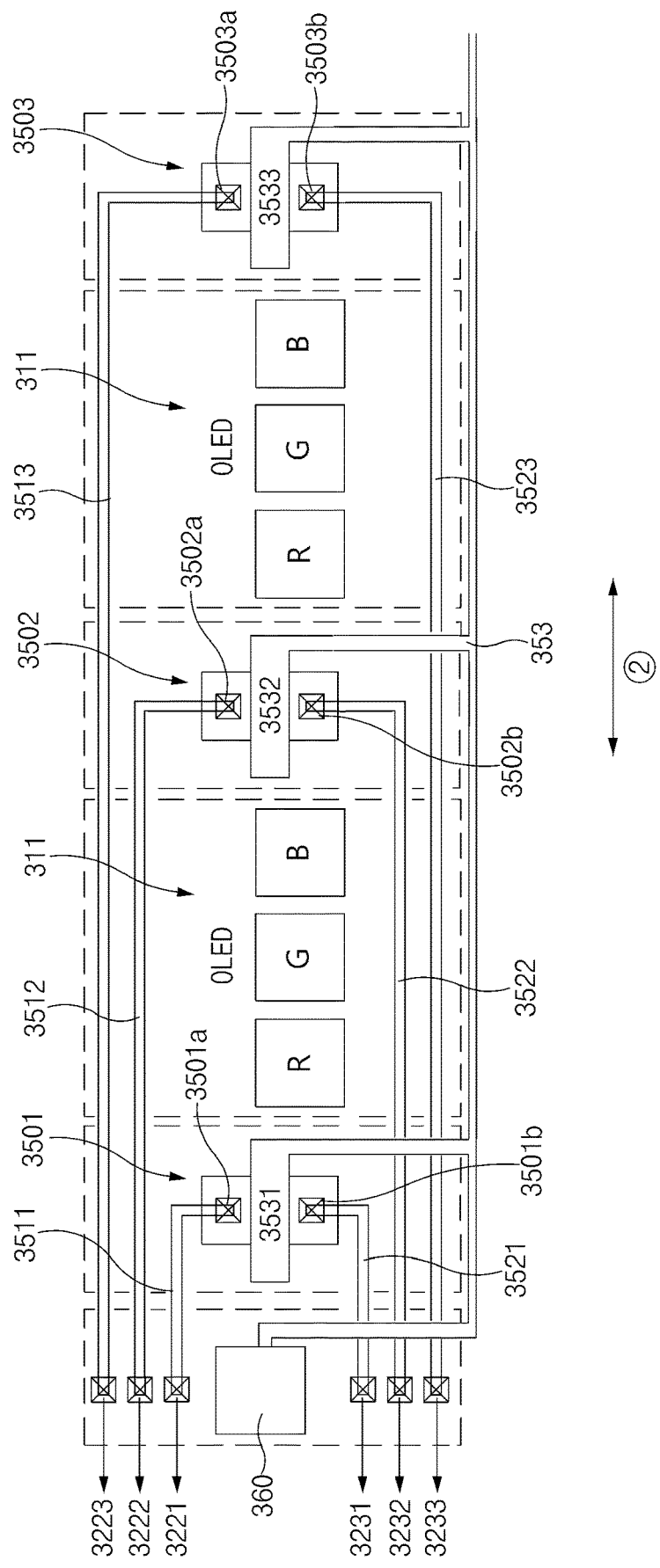
FIG. 8 is a plan view of a display panel corresponding to area A illustrated in FIG. 6A.
Figure 9:
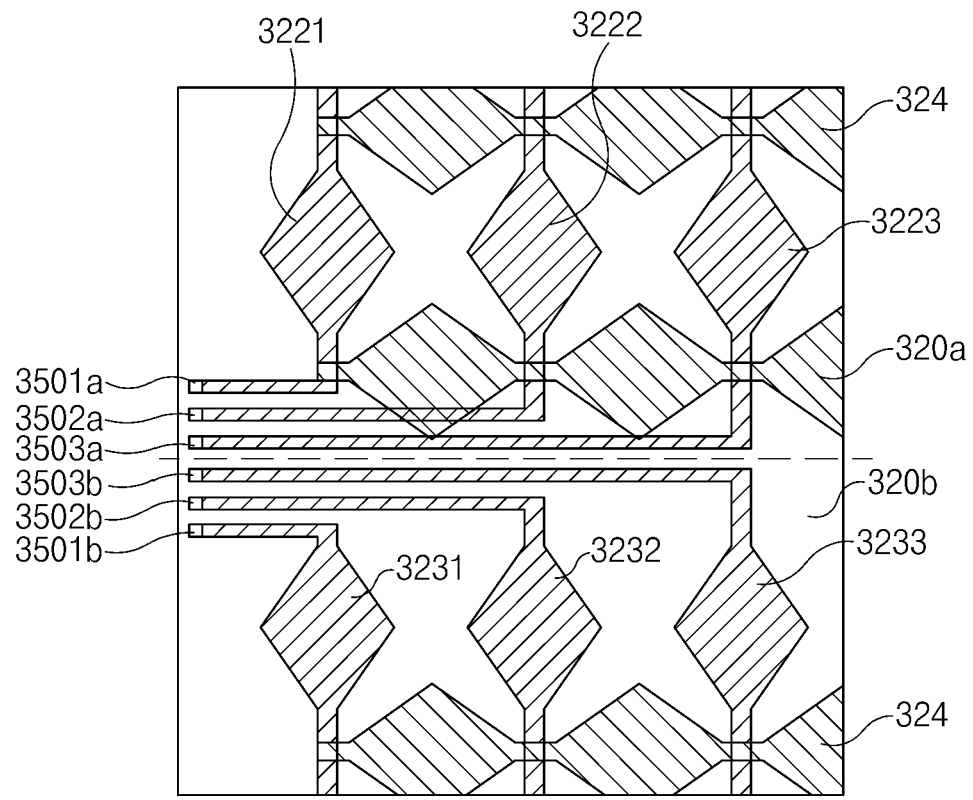
FIG. 9 is a plan view of the display panel corresponding to area A illustrated in FIG. 6A.

FIG. 8 is a plan view of the display panel 310 corresponding to portion A illustrated in FIG. 6A. FIG. 9 is a plan view of the touch sensor layer 320 corresponding to portion A illustrated in FIG. 6A.

Referring to FIG. 8, the pixels 311, each of which is constituted by RGB sub-pixels, and the switches 350 may be formed in the thin film transistor layer 314 formed on the substrate 312 of the display panel 310.

The switches 350 may include substantially the same number of sub-switches 3501, 3502, and 3503 as touch electrodes arranged in the second direction. The sub-switches 3501, 3502, and 3503 may open and close electrical connection between the first touch electrodes 322 in the fifth area 320*a* and the third touch electrodes 323 in the sixth area 320*b*.

The sub-switches 3501, 3502, and 3503 may be disposed side by side in the second direction of the display panel 310. One or more sub-pixels constituting the pixel array may be arranged between the switches 350.

The switches 350 may include input terminals 350*a* electrically connected with the first touch electrodes 322 in the fifth area 320*a*, output terminals 350*b* electrically connected with the third touch electrodes 323 in the sixth area 320*b*, and gate terminals to which opening/closing signals capable of opening and closing the input terminals 350*a* and the output terminals 350*b* are applied.

Input terminals 3501*a*, 3502*a*, and 3503*a* of the switches 350 may be connected to the outer portion 317 through input lines 3511, 3512, and 3513. Output terminals 3501*b*, 3502*b*, and 3503*b* of the switches 350 may be connected to the outer portion 317 through output lines 3521, 3522, and 3523. In this case, the lines may be formed on the thin film transistor layer 314, or may be formed on a separate wiring layer.

The input lines 3511, 3512, and 3513 extending to the outer portion 317 may be connected with the touch electrodes in the fifth area 320*a*. The output lines 3521, 3522, and 3523 extending to the outer portion 317 may be connected with the touch electrodes in the sixth area 320*b*.

The gate terminals of the switches 350 may be connected to the driver IC 360 located on the outer portion 317 through gate lines 3531, 3532, and 3533. The gate lines 3531, 3532, and 3533 may be formed to be one common line to which all of the gate terminals of the plurality of sub-switches 3501, 3502, and 3503 are connected. When the driver IC 360 applies electric current to the gate lines 3531, 3532, and 3533, the touch electrodes in the fifth area 320*a* and the sixth area 320*b* may be electrically connected, and a touch sensing function of the sixth area 320*b* may be driven.

Referring to FIG. 9, the first touch electrodes 3221, 3222, and 3223 in the fifth area 320*a* and third touch electrodes 3231, 3232, and 3233 in the sixth area 320*b* may extend outside the touch sensor layer 320.

Based on FIG. 8, the sub-switches arranged from left to right are referred to as the first sub-switch 3501, the second sub-switch 3502, and the third sub-switch 3503. Furthermore, based on FIG. 8, the touch electrodes located in the fifth area 320a among the touch electrodes arranged from left to right are referred to as touch electrode 1a 3221, touch electrode 2a 3222, and touch electrode 3a 3223. The touch electrodes located in the sixth area 320b among the touch electrodes are referred to as touch electrode 1b 3231, touch electrode 2b 3232, and touch electrode 3b 3233.

The first sub-switch 3501 may open and close electrical connection between touch electrode 1a 3221 and touch electrode 1b 3231. The input terminal 3501a of the first sub-switch 3501 may be connected with touch electrode 1a 3221 through the first input line 3511, and the output terminal 3501b may be connected with touch electrode 1b 3231 through the first output line 3521.

The second sub-switch 3502 may open and close electrical connection between touch electrode 2a 3222 and touch electrode 2b 3232. The input terminal 3502a of the second sub-switch 3502 may be connected with touch electrode 2a 3222 through the second input line 3512, and the output terminal 3502b may be connected with touch electrode 2b 3232 through the second output line 3522.

The third sub-switch 3503 may open and close electrical connection between touch electrode 3a 3223 and touch electrode 3b 3233. The input terminal 3503a of the third sub-switch 3503 may be connected with touch electrode 3a 3223 through the third input line 3513, and the output terminal 3503b may be connected with touch electrode 3b 3233 through the third output line 3523.

Accordingly, whether to operate the touch sensor in the sixth area 320b may be controlled by using the sub-switches 3501, 3502, and 3503.

Referring to FIGS. 8 and 9, the driver IC 360 may be disposed on the outer portion 317 that the substrate 312 further extends from the display panel 310 to the outside to form. The gate terminals of the sub-switches 3501, 3502, and 3503 may be connected to the driver IC 360 through the gate lines 3531, 3532, and 3533. The gate lines may include one common gate line 353.

When a predetermined voltage or current is applied from the driver IC 360 to the gate terminals of the switches 350, the input terminals and the output terminals of the switches 350 may be electrically connected, and therefore the touch sensor electrodes 3231, 3232, and 3233 in the sixth area 320b may be operated.

Figure 10:
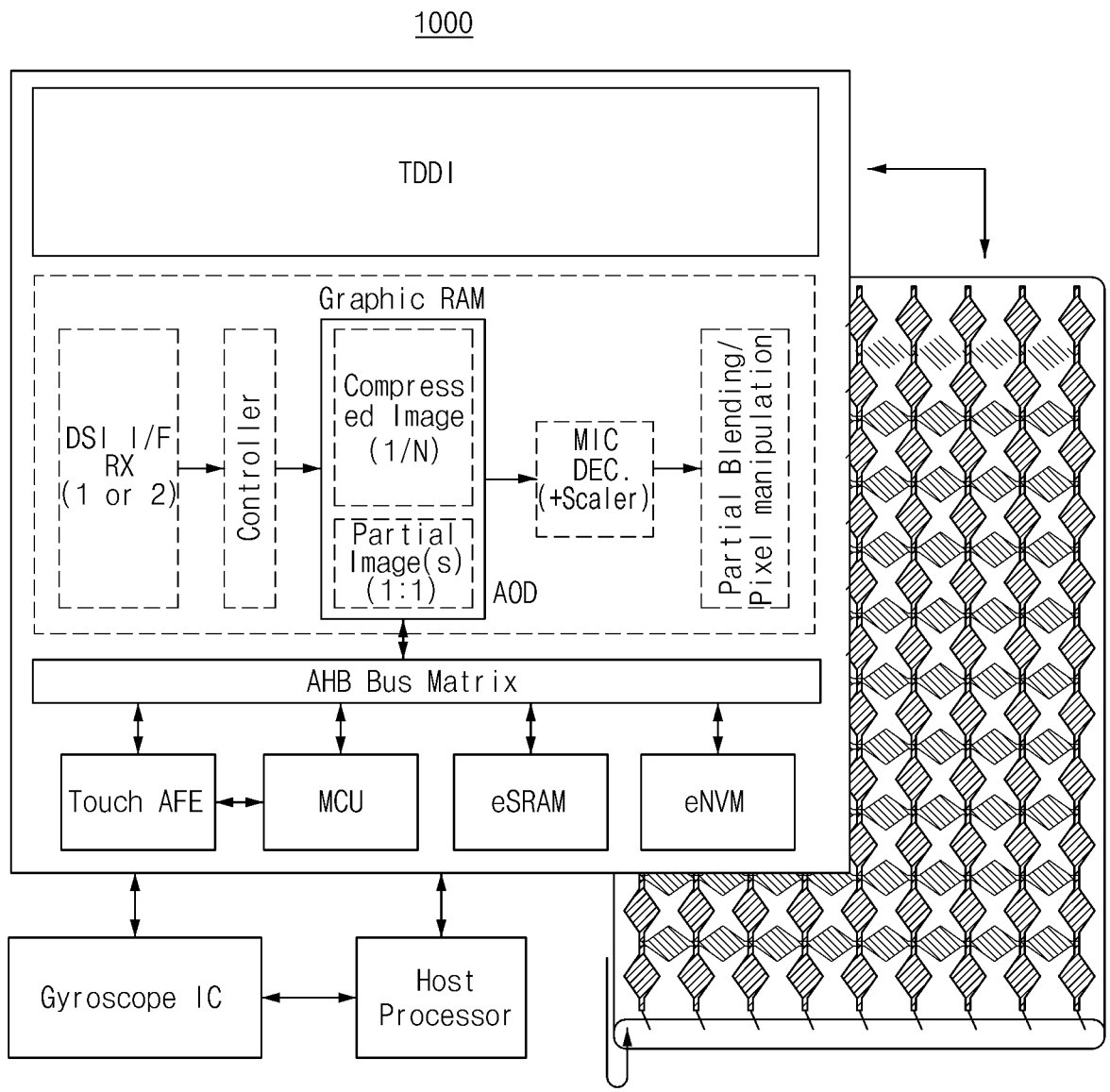
FIG. 10 is a block diagram of an electronic device according to an embodiment of the disclosure.

FIG. 10 is a block diagram of an electronic device according to an embodiment of the disclosure. The electronic device 1000 that will be described below with reference to FIG. 10 and the following drawings may be referred to as the electronic device 100 described above with reference to FIGS. 1A to 1C and the electronic device 200 described above with reference to FIG. 2. The second area 300b may include the second surface 2122 and the third surface 2123 described above with reference to FIG. 2. In an embodiment, the electronic device 1000 may be formed to control the above-described flexible display 300. The electronic device 1000 may further include the display driver IC 360 that drives the flexible display 300 and a processor that controls the display driver IC 360.

The processor may determine a state (an open state, a closed state, or a state between the open state and the closed state) of the electronic device through a sensor. The sensor may include a gyroscope sensor.

In the closed state, the processor may control the driver IC (TDDI) 260 to open the switches (350 of FIG. 6A) formed on the display panel. When the switches are opened, the touch electrodes in the sixth area cannot detect a touch input any more. Accordingly, an unnecessary touch input may be prevented from being applied to a flexible area not located in the display area.

In the open state and the state between the open state and the closed state, the processor may control the driver IC (TDDI) 260 to short-circuit the switches. When the switches are short-circuited, power may be applied to the touch electrodes in the sixth area, and a touch input may be detected. Accordingly, a user may apply a touch input to the second area 300b extended.

Figure 11:
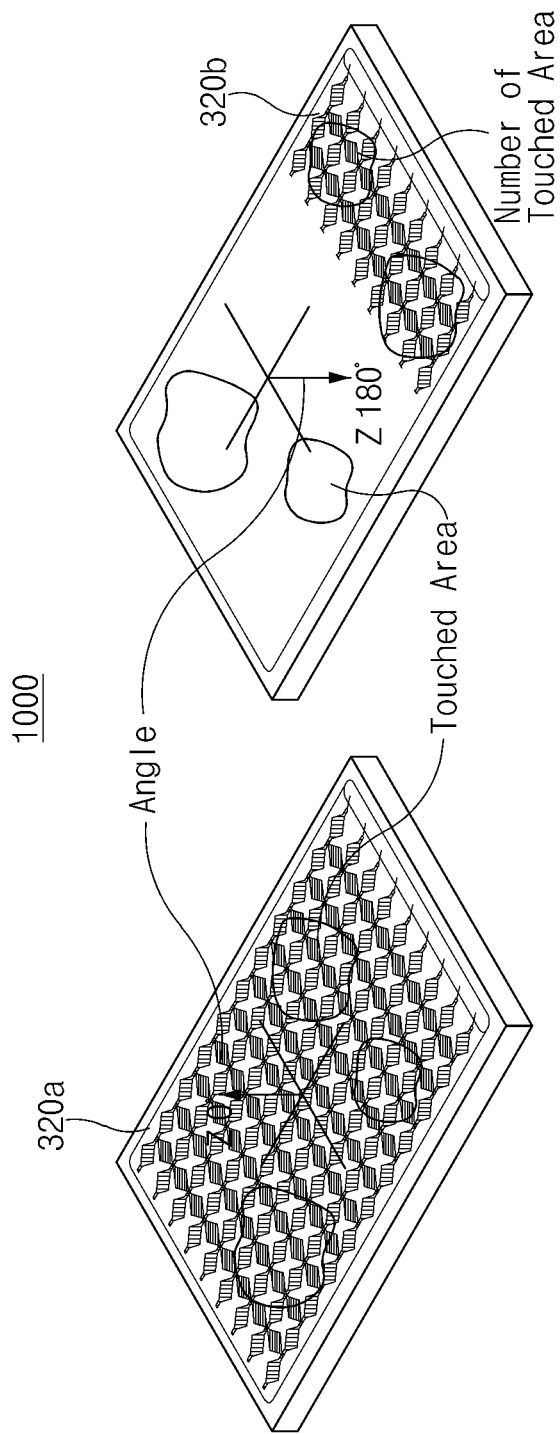
FIG. 11 is a view illustrating a method for detecting a posture of a user by the electronic device according to an embodiment of the disclosure.

FIG. 11 is a view illustrating a method for detecting a posture of a user by the electronic device 1000 according to an embodiment of the disclosure.

Here, the surface on which the display area is formed is referred to as the front surface of the electronic device.

Referring to FIG. 11, the electronic device 1000 may detect a posture of the user of the electronic device 1000 at present and a display used by the user at present, through the plurality of touch electrodes formed on the touch sensor layer 320 and the gyroscope sensor provided inside the electronic device 1000. Specifically, the gyroscope sensor may measure the angle between the normal vector of the front surface of the electronic device and the vertical direction.

For example, in a case where the angle between the normal vector of the front surface of the electronic device 1000 and the vertical direction is 0 degrees and a continuous touch signal is input to the fifth area 320a, it may be determined that the user uses the first area 300a in a correct position.

In a case where the angle between the normal vector of the front surface of the electronic device 1000 and the vertical direction is 180 degrees and a continuous touch signal is input to the sixth area 320b, it may be determined that the user uses the first area 300a in a lying position.

In a case where the angle between the normal vector of the front surface of the electronic device 1000 and the vertical direction is 0 degrees and a continuous touch signal is input to the sixth area 320b, it may be determined that the user uses the second area 300b in a correct position.

In a case where the angle between the normal vector of the front surface of the electronic device 1000 and the vertical direction is 180 degrees and a continuous touch signal is input to the sixth area 320b, it may be determined that the user uses the second area 300b in a lying position.

In determining the posture of the user, the angle between the normal vector of the front surface of the electronic device 1000 and the vertical direction is not limited to 0 degrees and 180 degrees and may be extended to a predetermined range of angles.

Figure 12:
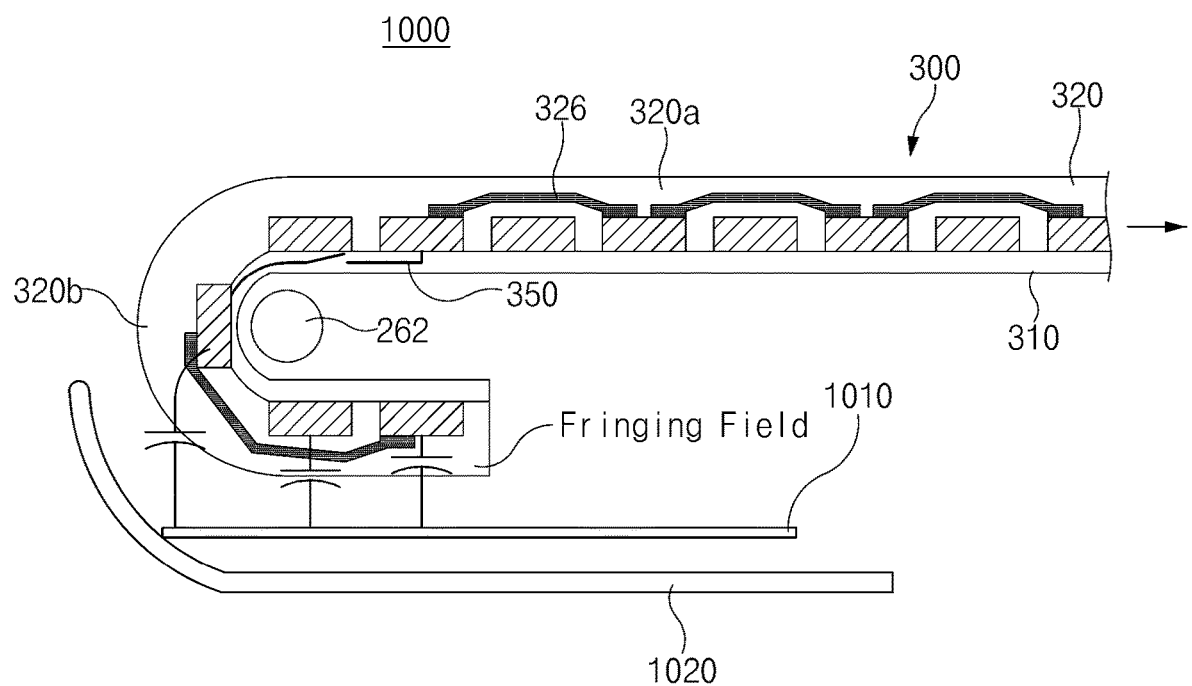
FIG. 12 is a view illustrating a method for determining the position of a rigid area of a flexible display by the electronic device according to an embodiment of the disclosure.

FIG. 12 is a view illustrating a method for determining the position of the second area 300b of the flexible display 300 or the state of the electronic device 1000 by the electronic device 1000 according to an embodiment of the disclosure.

Referring to FIG. 12, the electronic device 1000 may include a conductor 1010 formed parallel to the flexible display 300 and formed inside the electronic device 1000. In this case, while the first area 300a of the flexible display 300 is fixed to the electronic device 1000, the second area 300b may be moved by a sliding cover 1020 and the roller 262 formed in the sliding cover 1020. The conductor 1010 may be fixed inside the electronic device.

The second area 300b may be moved to the display area on the front surface of the electronic device 1000 by the roller 262 while being pulled by the first area 300a.

At this time, a fringing field may be formed between the second area 300b sliding relative to the electronic device 1000 and the conductor 1010 fixed to the electronic device 1000. The fringing field may be a field formed between an electrode and an electrode, and the value may vary when the positions of the electrodes are changed. The fringing field may be formed between the conductor 1010 formed inside the electronic device 1000 and the touch electrodes included in the sixth area 320b.

In a case where the first area 300a of the flexible display 300 is accommodated in the electronic device 1000, that is, in a case where the second area 300b is fixedly disposed parallel to the conductor, the positions of the electrodes that form the fringing field are fixed, and therefore there is no change in the fringing field. In contrast, in a case where the second area 300b moves as the sliding cover 1020 slides, displacement may be caused between the touch electrodes in the sixth area 320b and the conductor formed inside the electronic device 1000, and therefore the fringing field may be changed. Whether the second area 300b is moved and whether the electronic device 1000 is in an open state, a closed state, or a state between the open state and the closed state may be determined in this way.

Figure 13:
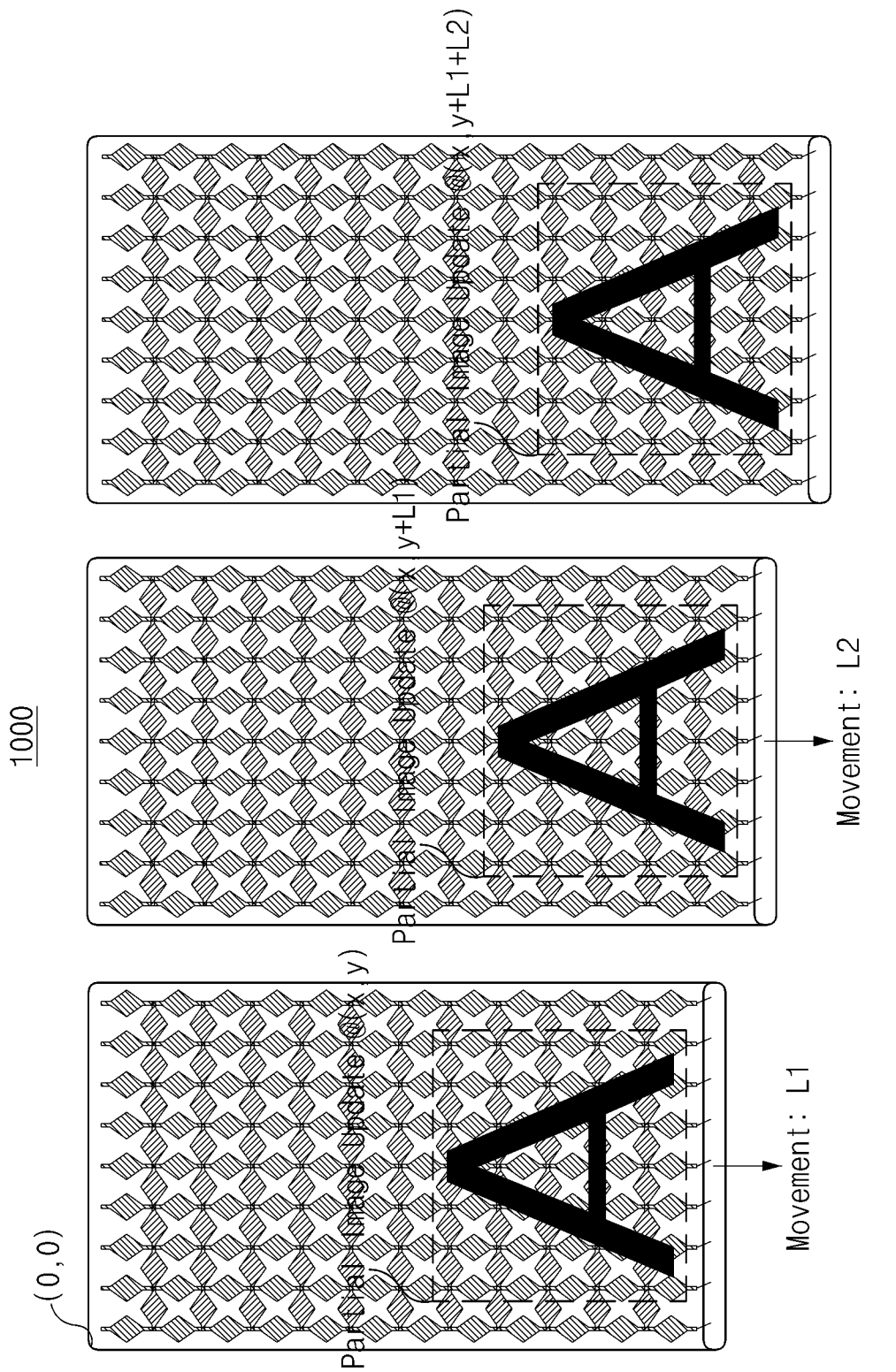
FIG. 13 is a view illustrating a method for updating a pixel image of the electronic device when a display area of the electronic device is extended according to an embodiment of the disclosure.

FIG. 13 is a view illustrating a method for updating a pixel image of the electronic device when the display area is extended.

A screen illustrated on a left side corresponds to a state (the closed state 201 of FIG. 3) in which the first area 300a of the flexible display 300 is located in the display area, and a screen illustrated on a right side corresponds to a state (the open state 202 of FIG. 3) in which the second area 300b is extended on the same plane in one direction of the first area 300a.

The electronic device 1000 may include a processor configured to update the coordinates of pixels. When the second area 300b is moved to the display area so that the display area is extended, the processor may, in real time, update the coordinates of pixels appearing in the first area 300a. Whether the display area is extended or not and the extended area may be detected by the above-described method.

The direction of arrows illustrated in FIG. 13 is referred to as an extension direction. A coordinate system (x, y) including the y-axis facing in the extension direction of the display area and the x-axis facing in the direction perpendicular to the extension direction is defined, and an upper left end of the display area is defined as the origin (0, 0).

Specifically, only the first area 300a of the flexible display 300 is disposed in the display area, and any image is displayed. In a case where the second area 300b of the flexible display 300 is additionally disposed in the display area so that the display area is extended, the processor may control the driver IC 360 to update the coordinates of the image illustrated in the first area 300a in the extension direction and display the image based on the updated coordinates. That is, when the display area is extended by L1 in the extension direction, the coordinates of pixels of the displayed image in the extension direction may be updated so as to be increased by L1.

When the display area is additionally extended by L2 in the extension direction, the coordinates of pixels of the displayed image in the extension direction may be updated so as to be additionally increased by L2.

The image output on the flexible display 300 may include an image output in an always on display (AOD) manner. In this case, the flexible display 300 may always display specified text, an icon, or the like in a state in which there is no separate user input.

Figure 14:
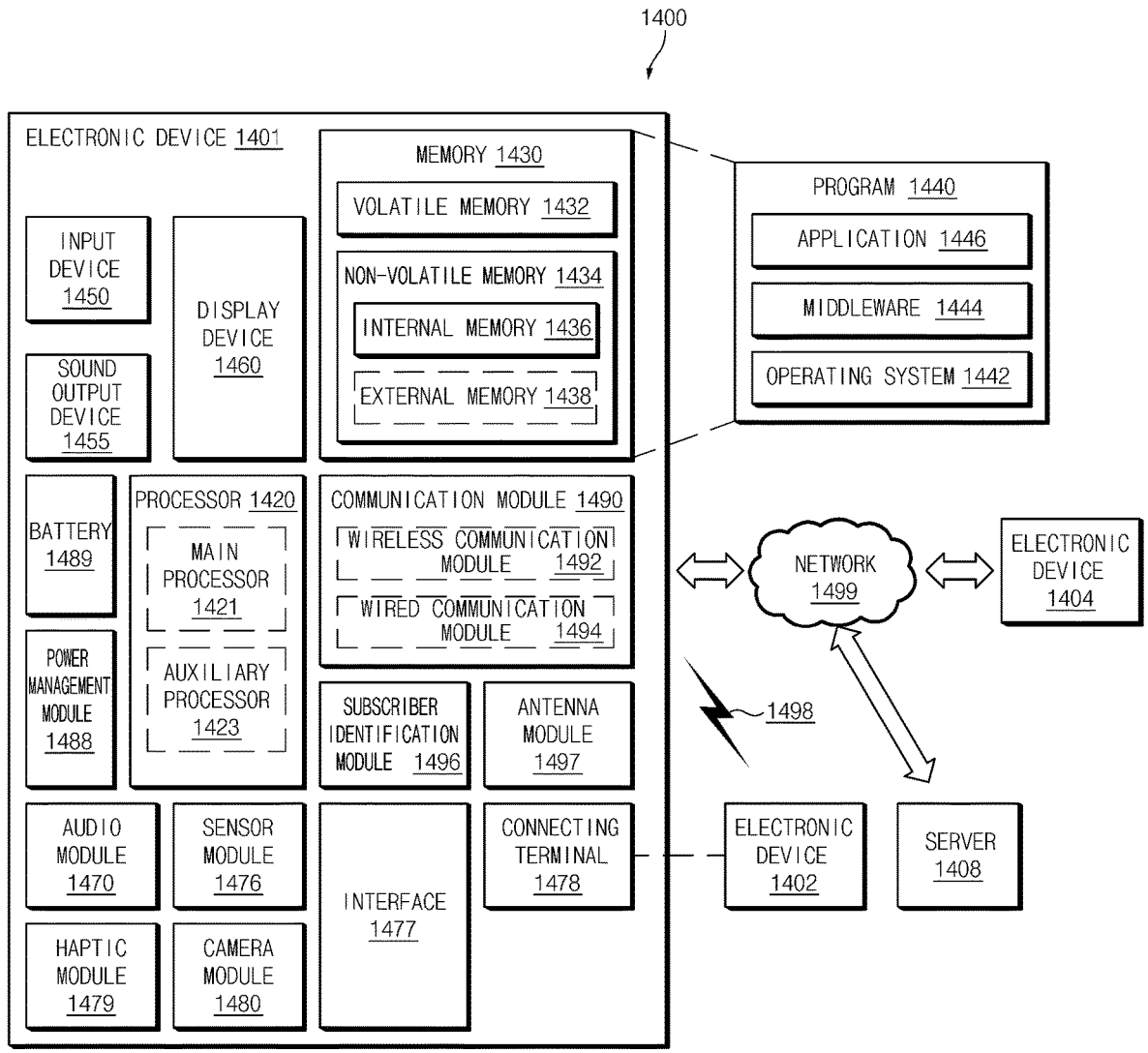
FIG. 14 is a block diagram of an electronic device in a network environment according to various embodiments.

FIG. 14 is a block diagram of an electronic device in a network environment according to various embodiments.

Referring to FIG. 14, an electronic device 1401 may communicate with an electronic device 1402 through a first network 1498 (e.g., a short-range wireless communication) or may communicate with an electronic device 1404 or a server 1408 through a second network 1499 (e.g., a long-distance wireless communication) in a network environment 1400. According to an embodiment, the electronic device 1401 may communicate with the electronic device 1404 through the server 1408. According to an embodiment, the electronic device 1401 may include a processor 1420, a memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module 1496, and an antenna module 1497. According to some embodiments, at least one (e.g., the display device 1460 or the camera module 1480) among components of the electronic device 1401 may be omitted or other components may be added to the electronic device 1401. According to some embodiments, some components may be integrated and implemented as in the case of the sensor module 1476 (e.g., a fingerprint sensor, an iris sensor, or an illuminance sensor) embedded in the display device 1460 (e.g., a display).

The processor 1420 may operate, for example, software (e.g., a program 1440) to control at least one of other components (e.g., a hardware or software component) of the electronic device 1401 connected to the processor 1420 and may process and compute a variety of data. The processor 1420 may load a command set or data, which is received from other components (e.g., the sensor module 1476 or the communication module 1490), into a volatile memory 1432, may process the loaded command or data, and may store result data into a nonvolatile memory 1434. According to an embodiment, the processor 1420 may include a main processor 1421 (e.g., a central processing unit or an application processor) and an auxiliary processor 1423 (e.g., a graphic processing device, an image signal processor, a sensor hub processor, or a communication processor), which operates independently from the main processor 1421, additionally or alternatively uses less power than the main processor 1421, or is specified to a designated function. In this case, the auxiliary processor 1423 may operate separately from the main processor 1421 or embedded.

In this case, the auxiliary processor 1423 may control, for example, at least some of functions or states associated with at least one component (e.g., the display device 1460, the sensor module 1476, or the communication module 1490) among the components of the electronic device 1401 instead of the main processor 1421 while the main processor 1421 is in an inactive (e.g., sleep) state or together with the main processor 1421 while the main processor 1421 is in an active (e.g., an application execution) state. According to an embodiment, the auxiliary processor 1423 (e.g., the image signal processor or the communication processor) may be implemented as a part of another component (e.g., the camera module 1480 or the communication module 1490) that is functionally related to the auxiliary processor 1423. The memory 1430 may store a variety of data used by at least one component (e.g., the processor 1420 or the sensor module 1476) of the electronic device 1401, for example, software (e.g., the program 1440) and input data or output data with respect to commands associated with the software.

The memory 1430 may include the volatile memory 1432 or the nonvolatile memory 1434.

The program 1440 may be stored in the memory 1430 as software and may include, for example, an operating system 1442, a middleware 1444, or an application 1446.

The input device 1450 may be a device for receiving a command or data, which is used for a component (e.g., the processor 1420) of the electronic device 1401, from an outside (e.g., a user) of the electronic device 1401 and may include, for example, a microphone, a mouse, or a keyboard.

The sound output device 1455 may be a device for outputting a sound signal to the outside of the electronic device 1401 and may include, for example, a speaker used for general purposes, such as multimedia play or recordings play, and a receiver used only for receiving calls. According to an embodiment, the receiver and the speaker may be either integrally or separately implemented.

The display device 1460 may be a device for visually presenting information to the user of the electronic device 1401 and may include, for example, a display, a hologram device, or a projector and a control circuit for controlling a corresponding device. According to an embodiment, the display device 1460 may include a touch circuitry or a pressure sensor for measuring an intensity of pressure on the touch.

The audio module 1470 may convert a sound and an electrical signal in dual directions. According to an embodiment, the audio module 1470 may obtain the sound through the input device 1450 or may output the sound through an external electronic device (e.g., the electronic device 1402 (e.g., a speaker or a headphone)) wired or wirelessly connected to the sound output device 1455 or the electronic device 1401.

The sensor module 1476 may generate an electrical signal or a data value corresponding to an operating state (e.g., power or temperature) inside or an environmental state outside the electronic device 1401. The sensor module 1476 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1477 may support a designated protocol wired or wirelessly connected to the external electronic device (e.g., the electronic device 1402). According to an embodiment, the interface 1477 may include, for example, an HDMI (high-definition multimedia interface), a USB (universal serial bus) interface, an SD card interface, or an audio interface.

A connecting terminal 1478 may include a connector that physically connects the electronic device 1401 to the external electronic device (e.g., the electronic device 1402), for example, an HDMI connector, a USB connector, an SD card connector, or an audio connector (e.g., a headphone connector).

The haptic module 1479 may convert an electrical signal to a mechanical stimulation (e.g., vibration or movement) or an electrical stimulation perceived by the user through tactile or kinesthetic sensations. The haptic module 1479 may include, for example, a motor, a piezoelectric element, or an electric stimulator.

The camera module 1480 may shoot a still image or a video image. According to an embodiment, the camera module 1480 may include, for example, at least one lens, an image sensor, an image signal processor, or a flash.

The power management module 1488 may be a module for managing power supplied to the electronic device 1401 and may serve as at least a part of a power management integrated circuit (PMIC).

The battery 1489 may be a device for supplying power to at least one component of the electronic device 1401 and may include, for example, a non-rechargeable (primary) battery, a rechargeable (secondary) battery, or a fuel cell.

The communication module 1490 may establish a wired or wireless communication channel between the electronic device 1401 and the external electronic device (e.g., the electronic device 1402, the electronic device 1404, or the server 1408) and support communication execution through the established communication channel. The communication module 1490 may include at least one communication processor operating independently from the processor 1420 (e.g., the application processor) and supporting the wired communication or the wireless communication. According to an embodiment, the communication module 1490 may include a wireless communication module 1492 (e.g., a cellular communication module, a short-range wireless communication module, or a GNSS (global navigation satellite system) communication module) or a wired communication module 1494 (e.g., an LAN (local area network) communication module or a power line communication module) and may communicate with the external electronic device using a corresponding communication module among them through the first network 1498 (e.g., the short-range communication network such as a Bluetooth, a WiFi direct, or an IrDA (infrared data association)) or the second network 1499 (e.g., the long-distance wireless communication network such as a cellular network, an internet, or a computer network (e.g., LAN or WAN)). The above-mentioned various communication modules 1490 may be implemented into one chip or into separate chips, respectively.

According to an embodiment, the wireless communication module 1492 may identify and authenticate the electronic device 1401 using user information stored in the subscriber identification module 1496 in the communication network.

The antenna module 1497 may include one or more antennas to transmit or receive the signal or power to or from an external source. According to an embodiment, the communication module 1490 (e.g., the wireless communication module 1492) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1401 and the external electronic device 1404 through the server 1408 connected to the second network 1499. Each of the electronic devices 1402 and 1404 may be the same or different types as or from the electronic device 1401. According to an embodiment, all or some of the operations performed by the electronic device 1401 may be performed by another electronic device or a plurality of external electronic devices. When the electronic device 1401 performs some functions or services automatically or by request, the electronic device 1401 may request the external electronic device to perform at least some of the functions related to the functions or services, in addition to or instead of performing the functions or services by itself. The external electronic device receiving the request may carry out the requested function or the additional function and transmit the result to the electronic device 1401. The electronic device 1401 may provide the requested functions or services based on the received result as is or after additionally processing the received result. To this end, for example, a cloud computing, distributed computing, or client-server computing technology may be used.

Figure 15:
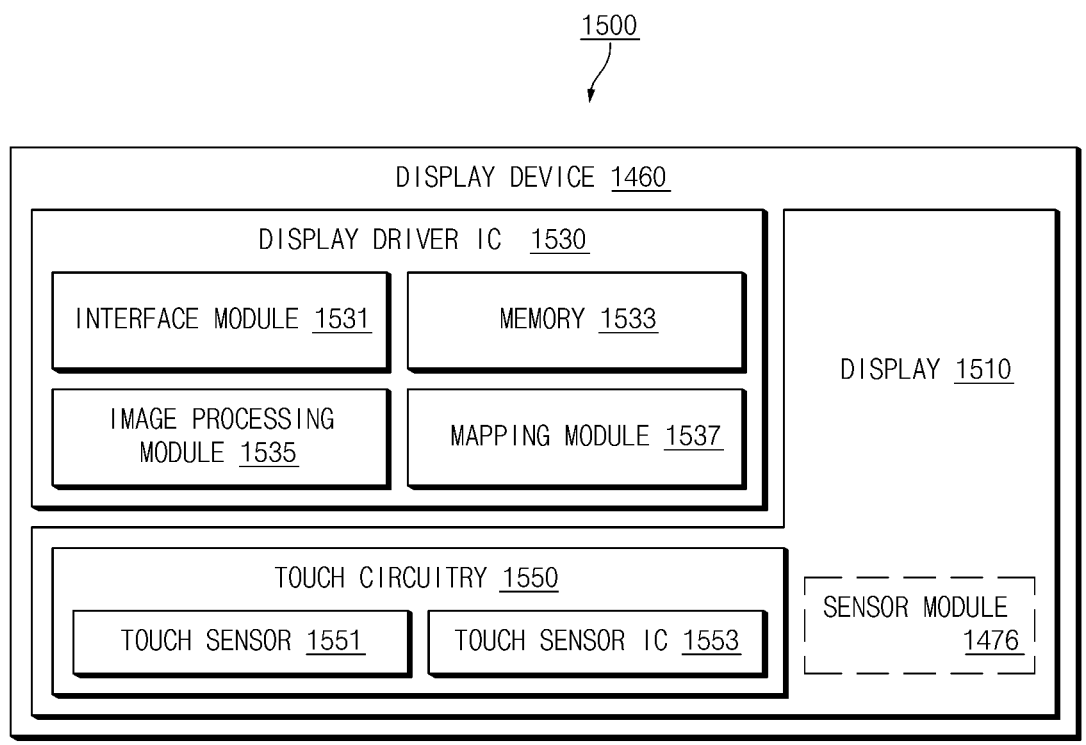
FIG. 15 is a block diagram of a display device according to various embodiments.

FIG. 15 is a block diagram of a display device according to various embodiments.

Referring to FIG. 15, the display device 1460 may include a display 1510 and a display driver IC (DDI) 1530 for controlling the display 1510. The DDI 1530 may include an interface module 1531, a memory 1533 (e.g., a buffer memory), an image processing module 1535, or a mapping module 1537. For example, the DDI 1530 may receive image information including image data or an image control signal corresponding to a command for controlling the image data from a processor 1420 (e.g., a main processor 1421 or an application processor) or an auxiliary processor 1423, which is operated independently of the main processor 1421, through the interface module 1531. The DDI 1530 may communicate with a touch circuit 1550, the sensor module 1476, or the like through the interface module 1531. In addition, the DDI 1530 may store at least a part of the received image information in the memory 1533, for example, in units of frames. For example, the image processing module 1535 may perform preprocessing or post-processing (e.g., adjustment of resolution, brightness, or size) on at least a part of the image data based at least partially on characteristics of the image data or the display 1510. The mapping module 1537 may convert the image data preprocessed or post-processed through the image processing module 1535 into a voltage value or a current value capable of driving the pixels, based at least partially on attributes of the pixels of the display 1510 (e.g., an array of pixels (RGB stripe or pentile) or a size of each of sub-pixels). For example, at least some pixels of the display 1510 may be driven based on the voltage or current value, such that visual information (e.g., a text, an image, or an icon) corresponding to the image data is displayed on the display 1510.

According to an embodiment, the display device 1460 may further include the touch circuit 1550. The touch circuit 1550 may include a touch sensor 1551 and a touch sensor IC 1553 for controlling the touch sensor 1551. The touch sensor IC 1553 may controls the touch sensor 1551 to measure, for example, a change in a signal (e.g., a voltage, a light amount, a resistance, or a charge amount) at a specific position of the display 1510 to sense a touch input or a hovering input, and may provide information (e.g., a location, an area, a pressure or a time) about the sensed touch input or hovering input to the processor 1420. According to an embodiment, at least a part (e.g., the touch sensor IC 1553) of the touch circuit 1550 may be included as a part of the display driver IC 1530 or the display 1510, or as a part of another component (e.g., the auxiliary processor 1423) arranged outside the display device 1460.

According to an embodiment, the display device 1460 may further include at least one sensor (e.g., a fingerprint sensor, an iris sensor, a pressure sensor or an illuminance sensor) of the sensor module 1476, or a control circuitry thereof. In this case, the at least one sensor or the control circuitry thereof may be embedded in a part (e.g., the display 1510 or the DDI 1530) of the display device 1460 or a part of the touch circuit 1550. For example, when the sensor module 1476 embedded in the display device 1460 includes a biometric sensor (e.g., a fingerprint sensor), the biometric sensor may obtain biometric information associated with a touch input through an area of the display 1510. As another example, when the sensor module 1476 embedded in the display device 1460 includes a pressure sensor, the pressure sensor may obtain information about a pressure corresponding to a touch input through an area or entire area of the display 1510. According to an embodiment, the touch sensor 1551 or the sensor module 1476 may be arranged between pixels of the pixel layer of the display 1510, or above or below the pixel layer.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 1440) including an instruction stored in a machine-readable storage media (e.g., an internal memory 1436 or an external memory 1438) readable by a machine (e.g., a computer). The machine may be a device that calls the instruction from the machine-readable storage media and operates depending on the called instruction and may include the electronic device (e.g., the electronic device 1401). When the instruction is executed by the processor (e.g., the processor 1420), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A flexible display having a first area including a flat portion and a second area including a bendable portion extending from the flat portion of the first area, the flexible display comprising:
a display panel including a pixel array;
a touch sensor layer including a first electrode disposed in the first area and a second electrode disposed in the bendable portion of the second area; and
a switch disposed inside the display panel, wherein the switch is configured to selectively electrically connect the first electrode to the second electrode.

2. The flexible display of claim 1, wherein the switch is disposed between the flat portion of the first area and the bendable portion of the second area.

3. The flexible display of claim 1, wherein the switch includes at least one thin film transistor.

4. The flexible display of claim 1, wherein the switch includes a plurality of sub-switches,
wherein the pixel array includes a plurality of pixels formed and arranged on the display panel, and
wherein at least one of the plurality of pixels is formed between the plurality of sub-switches.

5. The flexible display of claim 1, wherein the switch includes a plurality of sub-switches,
wherein the touch sensor layer includes touch electrodes including a plurality of columns including the first electrode and a plurality of rows including a third electrode perpendicular to the first electrode, and
wherein the number of sub-switches is equal to the number of columns of touch electrodes.

6. The flexible display of claim 5, wherein each of the plurality of sub-switches includes an input terminal connected with a touch electrode of the first electrode, an output terminal connected with a touch electrode of the second electrode, and a gate terminal configured to electrically connect the input terminal and the output terminal, and
wherein the gate terminals of the respective sub-switches are connected to one common line.

7. The flexible display of claim 6, wherein the flexible display further comprises first control circuitry electrically connected with the one common line.

8. The flexible display of claim 7, wherein the flexible display further comprises second control circuitry electrically connected with the display panel or the touch sensor layer, and
wherein the first control circuitry and the second control circuitry are implemented with a single integrated circuit (IC).

9. The flexible display of claim 1, wherein the display panel includes a substrate, a thin film transistor layer formed on the substrate, and a light emitting diode formed on the thin film transistor layer,
wherein the switch includes a plurality of sub-switches, and
wherein each of the plurality of sub-switches is implemented with a thin film transistor included in the thin film transistor layer.

10. The flexible display of claim 1, wherein the touch sensor layer includes a substrate, and
wherein the first electrode, the second electrode, or the switch is disposed on the substrate.

11. The flexible display of claim 10,
wherein the flexible display further comprises a thin film encapsulation layer configured to block access of external oxygen to the display panel.

12. The flexible display of claim 1, wherein the display panel includes a base substrate, a thin film transistor layer disposed on the base substrate and having the pixel array formed therein, and a thin film encapsulation layer configured to cover the pixel array,
wherein the base substrate includes an outer portion further extending outside the thin film transistor layer,
wherein the touch sensor layer is formed over the thin film encapsulation layer,
wherein the switch includes a plurality of sub-switches,
wherein the flexible display further comprises control circuitry configured to control the plurality of sub-switches, and
wherein the control circuitry is disposed on the outer portion.

13. The flexible display of claim 12, wherein each of the plurality of sub-switches is formed in the touch sensor layer disposed over the thin film encapsulation layer or is formed of a thin film transistor included in the thin film transistor layer.

14. An electronic device comprising:
a flexible display including a first area and a second area extending from the first area in one direction;

a first structure having at least part of the flexible display disposed on a first surface thereof;

a second structure coupled to the first structure so as to slide in one direction relative to the first structure, the remaining part of the flexible display being disposed in the second structure; and a processor electrically connected with the flexible display, wherein the second structure slides relative to the first structure between an open state and a closed state, wherein a distance between an end portion of the first structure in one direction and an end portion of the second structure in one direction is increased when the second structure moves from the closed state to the open state, wherein in the open state, the first area is disposed on the first surface of the first structure, and the second area is disposed inside the second structure, wherein the second area is pulled into the second structure to form the first surface together with the first area when the second structure moves from the closed state to the open state, wherein the flexible display includes a display panel, a touch sensor layer formed over the display panel and including a first electrode disposed in the first area and a second electrode disposed in the second area, and a switch configured to electrically open or short-circuit the first electrode and the second electrode, and wherein the processor controls the switch to electrically open the first electrode and the second electrode when the second structure moves from the open state to the closed state.

* * * * *